United States Patent [19]
Minami et al.

[11] Patent Number: 5,175,722
[45] Date of Patent: Dec. 29, 1992

[54] POWER SUPPLY CIRCUIT FOR STABILIZING POWER INPUT TO A LASER DIODE

[75] Inventors: Akira Minami, Inagi; Shigenori Yanagi, Kawasaki, both of Japan

[73] Assignee: Fujitsu Limited, Kanagawa, Japan

[21] Appl. No.: 563,763

[22] Filed: Aug. 7, 1990

[30] Foreign Application Priority Data

| Aug. 8, 1989 | [JP] | Japan | 1-205435 |
| Aug. 30, 1989 | [JP] | Japan | 1-224248 |
| Aug. 30, 1989 | [JP] | Japan | 1-224249 |
| Sep. 4, 1989 | [JP] | Japan | 1-228992 |

[51] Int. Cl.$^5$ .............................. G11B 7/00
[52] U.S. Cl. ..................... 369/116; 372/29
[58] Field of Search ............ 369/107, 116; 372/26, 372/29, 31, 33, 38

[56] References Cited

U.S. PATENT DOCUMENTS 4,785,443 11/1988 Minami et al. .
4,811,329 3/1989 Shikama et al. .
4,819,242 4/1989 Kaku et al. .

FOREIGN PATENT DOCUMENTS 0262713 4/1988 European Pat. Off. .
2595857 9/1987 France .

Primary Examiner—Robert L. Richardson
Attorney, Agent, or Firm—Nikaido, Marmelstein, Murray & Oram

[57] ABSTRACT

A power supply circuit for supplying an electric power to a laser diode which is used for reading digital data on an optical memory medium, where the laser diode emits light when a current flowing therethrough exceeds a threshold level. The power supply circuit includes: a current source for outputting a current; an automatic power control circuit for controlling the current which is output from the current source so that an average power of light which is emitted from the laser diode to be equal to a predetermined value; a high frequency signal generating circuit for generating a high frequency signal; and a high frequency current control circuit for controllng a current which is supplied from the current source to the laser diode so that the current flowing through the laser diode is modulated by the high frequency signal. The minimum level of the current which flows through the laser diode, appears in each cycle of the current modulated by the high frequency signal, and is maintained below the threshold level. The high frequency modulation is carried out when reading data only, or is carried out through the writing and reading operation. Further, in the case the high frequency modulation is carried out when reading data only, the high frequency modulation may be stopped before and after the duration of the data write operation with some margins.

31 Claims, 30 Drawing Sheets

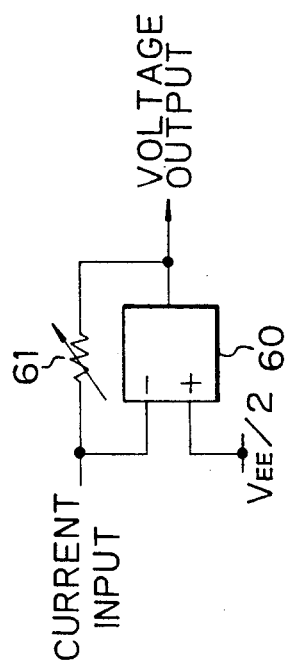
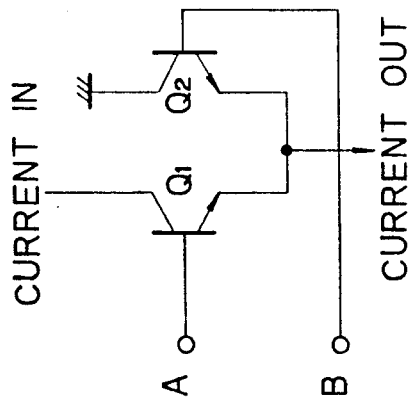
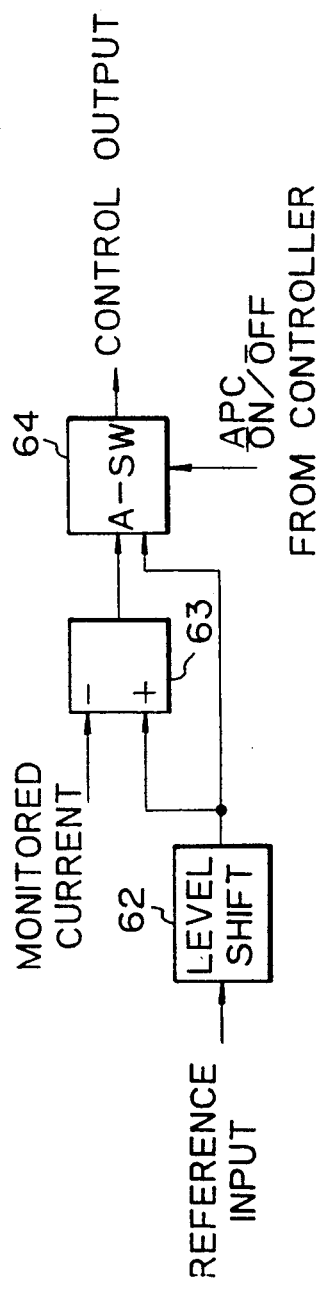

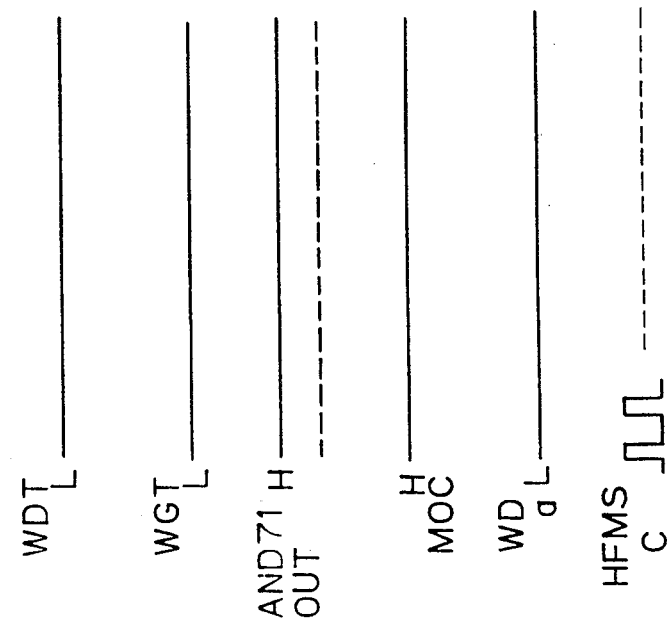
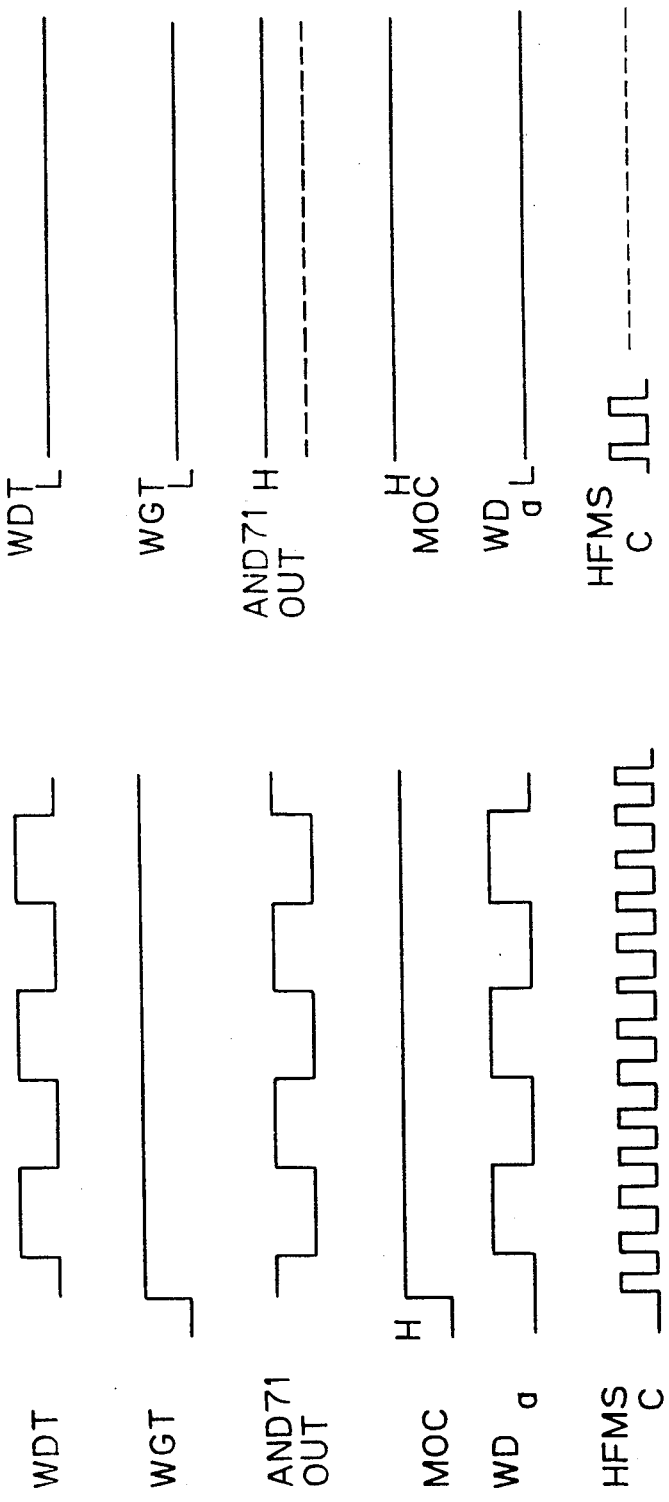

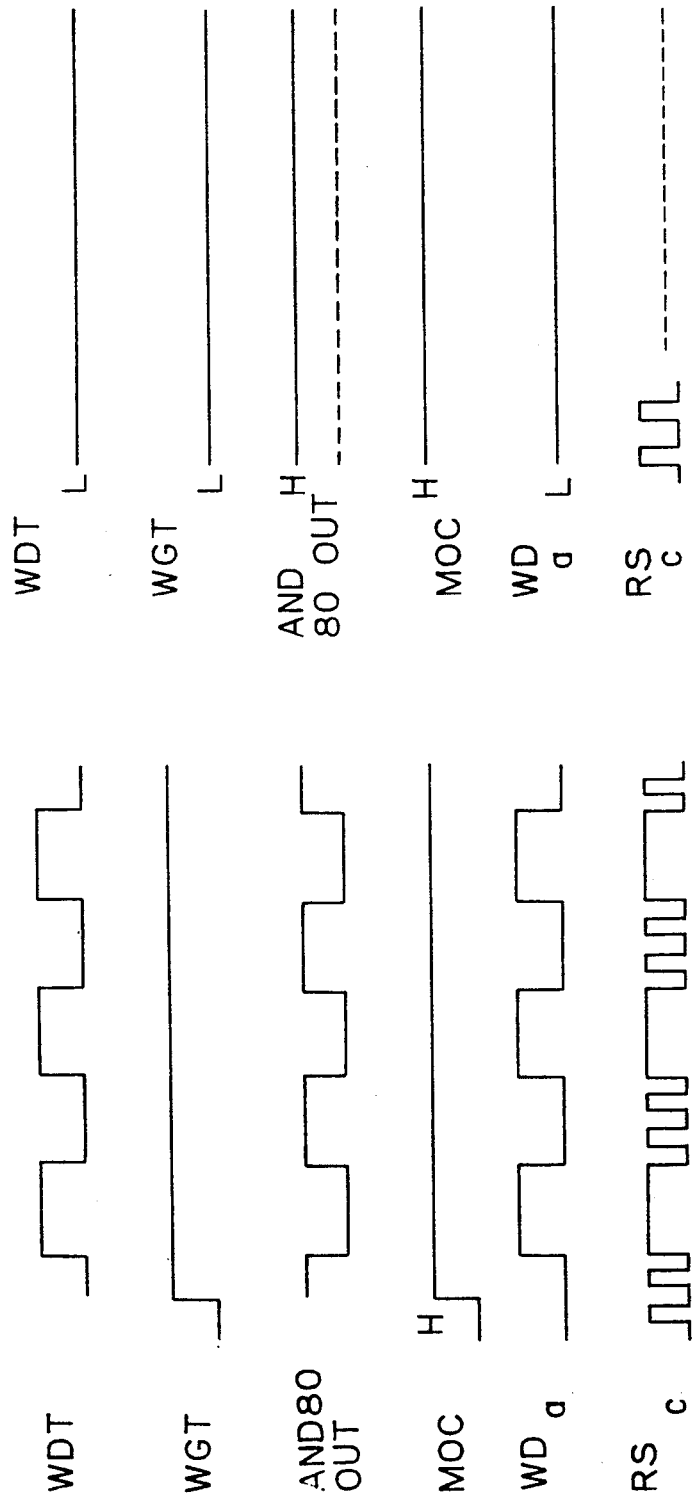

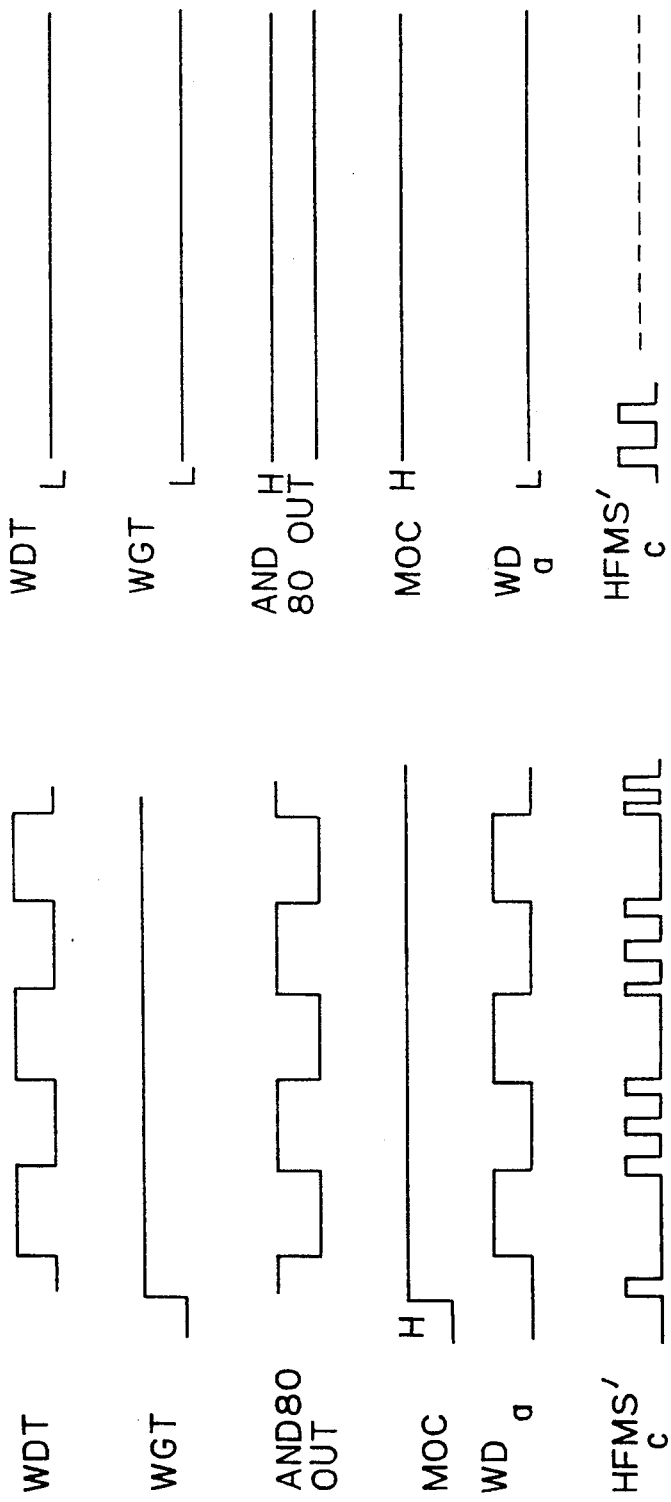

POWER SUPPLY CIRCUIT FOR STABILIZING POWER INPUT TO A LASER DIODE

BACKGROUND OF THE INVENTION

(1) Field of the Invention

The present invention relates to a power supply circuit for supplying electric power to a laser diode which is used for writing and reading digital data on an optical memory medium. Recently, many optical memory devices using an optical memory medium such as an optical disc, optomagnetic disc, optical memory card, and the like, have been developed. The above optical memory devices comprise an optical head, and the optical head comprises a laser diode for writing and reading digital data on the optical memory medium. The laser diode is driven by a small power when reading data, and is driven by a large power when writing data. It is known that a kind of noise called back talk noise will appear in the optical system in the optical memory device mainly due to a resonance phenomenon which occurs in an optical path of a laser beam between the laser diode and the surface of the memory medium. Further, it is known that the SN ratio of the light output of a laser diode is very low when the output level is low. Therefore, it is required to reduce or eliminate the back talk noise and improve the SN ratio in the low output level for stabilizing the reading and writing operations.

(2) Description of the Related Art

FIG. 1 shows a construction of a conventional power supply circuit for supplying an electric power to a laser diode for writing and reading digital data on an optical memory medium which is used in the conventional optical memory device. In FIG. 1, LD denotes a laser diode, PD denotes a photodiode, 1 denotes a second current supply circuit, 1a denotes a current switch circuit, 1b denotes a write current source, 2b denotes a voltage to current converter, 3 denotes a current branch circuit, 3a denotes a current switch circuit, 3b denotes a branch current source, 4 denotes an automatic power control circuit, 5 denotes a high frequency oscillator, 5′ denotes a coupling capacitor, 6 denotes a controller, 7a, 7b, and 7c each denote a digital to analog converter, and 10 denotes a current to voltage converter.

In the construction of FIG. 1, the automatic power control circuit 4 outputs a control voltage to supply to the laser diode an electric current which is necessary to emit a predetermined level of an average light power for reading data. The control voltage from the automatic power control circuit 4 is converted to the above current corresponding to the constant average light power for reading data in the voltage to current converter 2b, and the current from the voltage to current converter 2b is constantly supplied to the laser diode LD. When writing data on the optical memory medium, the current switch circuit 1a is made ON under control of a WDT signal from the controller 6, and therefore, the current from the write current source 1b is supplied to the laser diode LD in parallel with the current from the voltage to current converter 2b. The amount of the current from the write current source 1b is equal to the difference between an electric current which is necessary to emit a light power for writing data and the above current from the voltage to current converter 2b, and is preset by the output of the digital to analog converter 7a. The controller 6 supplies a control voltage value $V_W-V_R$ to the digital to analog converter 7a. In addition, a high frequency current is supplied to the laser diode LD from the high frequency oscillator 5 through the coupling capacitor 5′.

The light emitted from the laser diode LD is injected onto the surface of the optical memory medium, and the intensity of the emitted light is monitored by the photodiode PD. A current corresponding to the intensity (power) of the emitted light flows through the photodiode PD. An input terminal of the current to voltage converter 10 and the input terminal of the current branch circuit 3 is connected in parallel to one terminal of the photodiode PD. The controller 6 presets a control voltage $(V_W-V_R)'$ in the voltage to current converter 3b through the digital to analog converter 7c. The amount of the converted output current from the voltage to current converter 3b, corresponds to the difference between the current which flows in the photodiode PD when writing data and the current which flows in the photodiode PD when reading data. The current switch circuit 3a in the current branch circuit 3 is made ON under control of the WDT signal from the controller 6 when writing data. Therefore, a part of the current flowing through the photodiode PD corresponding to the above difference flows in the current branch circuit 3 when writing data, and the average of the current input to the current to voltage converter 10 is equal to the average current component flowing through the photodiode PD corresponding to the current which is supplied from the voltage to current converter 2b to the laser diode LD. The current to voltage converter 10 converts its input into a voltage corresponding to the input, and supplies its output to the automatic power control circuit 4. The automatic power control circuit 4 comprises an integrating error amplifier, further receives a reference voltage $V_{ref}$ from the controller 6, and compares the above voltage from the current to voltage converter 10 with the reference voltage $V_{ref}$ to obtains an average error voltage (average difference between the output of the current to voltage converter 10 and the reference voltage $V_{ref}$). Thus, the above-mentioned control voltage the amount of which corresponds to the above average error voltage, is suppled to the voltage to current converter 2b, and therefore the current which is supplied from the voltage to current converter 2b to the laser diode LD is controlled so that the average power of a portion of the light which is emitted from the laser diode LD due to the current from the voltage to current converter 2b is maintained at a constant value which is determined by the above reference voltage $V_{ref}$.

FIG. 2 shows the operation of the power supply circuit of FIG. 1 as explained above. When the WGT signal is inactive, a low power light which is used for reading data is emitted from the laser diode LD, where the average power in reading data is denoted by $P_R$. Responding to the active WGT signal, a high power light which is used for writing data is emitted from the laser diode LD, where the average power in writing data is denoted by $P_W$. The above-mentioned supply of the high frequency current to the laser diode LD in addition to the currents from the voltage to current converter 2b and the second current supply circuit 1, is effective to reduce the aforementioned back talk noise. Further, repeating of On and OFF operations at high frequency is effective to improve the SN ratio in the low output level of the light.

However, the characteristics of laser diodes are generally different between each other, and vary due to aging. FIG. 3 shows examples of the powers of the lights which are emitted from two different laser diodes (or the same laser diode before and after the characteristics change) which have different characteristics from each other in the conventional power supply circuit as shown in FIG. 1. In FIG. 3, a and b each denote a different characteristic curve of the laser diode, and FIG. 3 shows the case of reading data. Due to the above-mentioned automatic power control circuit 4, the average power of the emitted light is controlled to be equal to the constant value $P_R$ regardless of the difference in the characteristics of the laser diodes, however, the amplitude of the high frequency component varies with the characteristic of the laser diode as shown in FIG. 3. For example, in the case as shown by "B'" in FIG. 3, the light which is output from the laser diode cannot be made OFF even in the minimum power level of the light during the high frequency operation for reading data, i.e., the above-mentioned repeating of ON and OFF operations at high frequency are not effectively carried out due to the above change of the characteristics of the laser diode, and therefore the SN ration in the low output level of the light is not effectively improved. Further, when the amplitude of the high frequency modulation is large, the maximum output level of the light emitted from the laser diode exceeds the rated maximum power level of the laser diode as shown in FIG. 2. This excess power output may deteriorate the laser diode.

SUMMARY OF THE INVENTION

An object of the present invention is to provide a power supply circuit for supplying an electric power to a laser diode which is used for writing and reading digital data on an optical memory medium, whereby the SN ratio of the light emitted from the laser diode is improved in the low output power level.

Another object of the present invention is to provide a power supply circuit for supplying an electric power to a laser diode which is used for writing and reading digital data on an optical memory medium, whereby the back talk noise in the light emitted from the laser diode is reduced.

A further object of the present invention is to provide a power supply circuit for supplying an electric power to a laser diode which is used for writing and reading digital data on an optical memory medium, whereby the power level of the light emitted from the laser diode does not exceed a rated maximum power level.

According to the present invention, there is provided a power supply circuit for supplying an electric power to a laser diode which is used for reading digital data on an optical memory medium, where the laser diode emits light when a current flowing therethrough exceeds a threshold level. The power supply circuit comprises a current source, an automatic power control circuit, a high frequency signal generating circuit, and a high frequency current control circuit. The current source outputs a current. The automatic power control circuit controls the current which is output from the current source so that an average power of light which is emitted from the laser diode to be equal to a predetermined value. The high frequency signal generating circuit generates a high frequency signal. The high frequency current control circuit controls a current which is supplied from the current source to the laser diode so that the current flowing through the laser diode is modulated by the high frequency signal. The minimum level of the current which flows through the laser diode, appears in each cycle of the current modulated by the high frequency signal, and is maintained below the threshold level. The high frequency modulation is carried out when reading data only, or is carried out through the writing and reading operation. Further, in the case the high frequency modulation is carried out when reading data only, the high frequency modulation may be stopped before and after the duration of the data write operation with some margins.

BRIEF DESCRIPTION OF THE DRAWINGS

In the drawings:

FIG. 6 shows an example of the construction of the current switches in FIG. 4;

FIG. 7 shows an example of the construction of the current to voltage converter in FIG. 4;

FIG. 8 shows an example of the construction of the automatic power control circuit in FIG. 4;

FIGS. 10 and 11 show examples of the operations of the control signal generation circuit of FIG. 10;

FIGS. 16 and 17 show examples of the operations of the control signal generation circuit of FIG. 15;

FIGS. 23 and 24 show examples of the operations of the control signal generation circuit of FIG. 22;

DESCRIPTION OF THE PREFERRED EMBODIMENTS (1) The First Embodiment (FIGS. 4 to 14)

Figure 4:
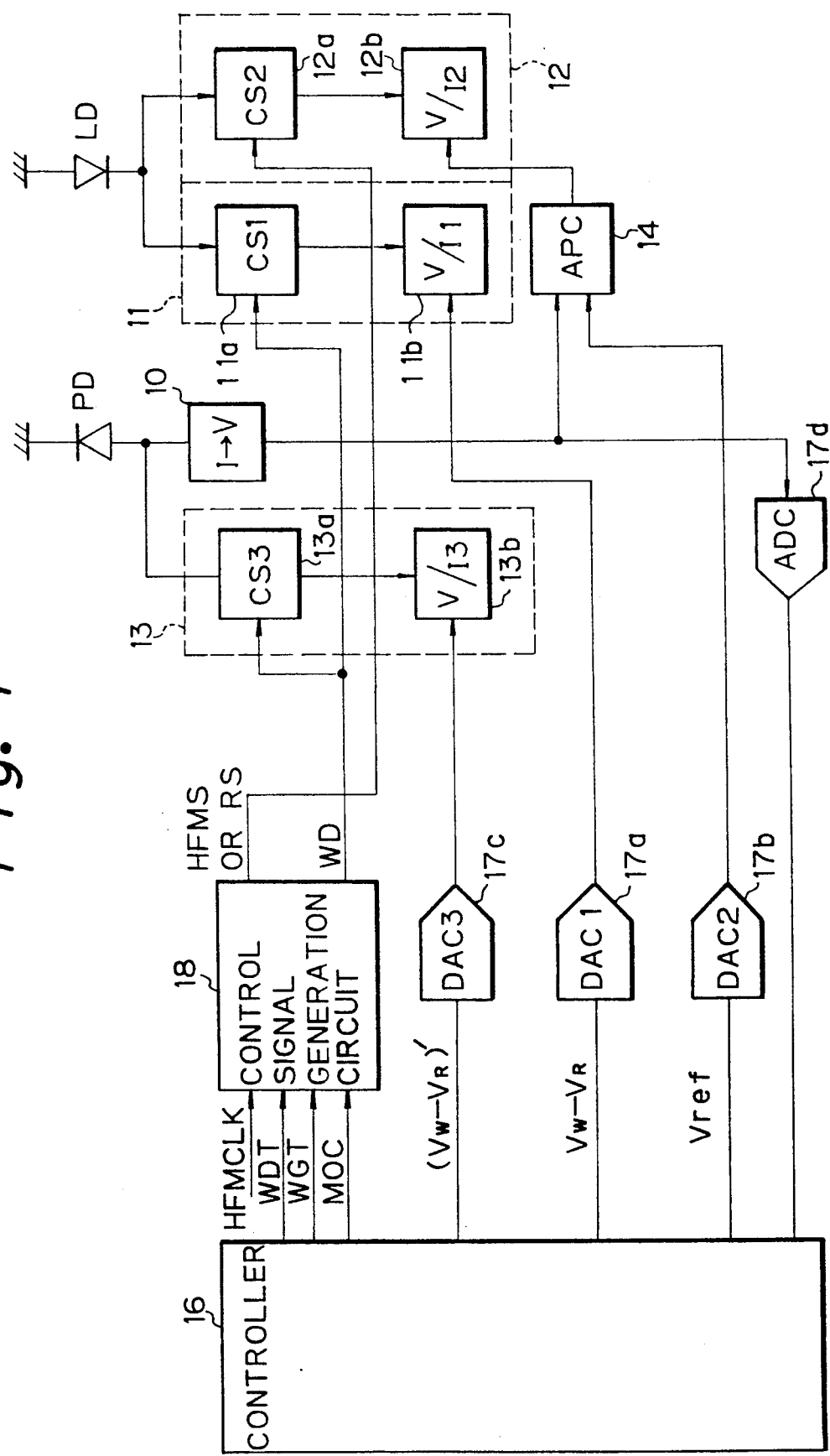
FIG. 4 is a block diagram of the construction used in the first and second embodiments of the present invention.

FIG. 4 is a block diagram of the construction used in the first and second embodiments of the present invention. In FIG. 4, the laser diode LD, the photodiode PD, and the current to voltage converter 10 are each the same as the corresponding component in the construction of FIG. 1, and reference numeral 12 denotes a first current supply circuit, 11 denotes a second current supply circuit, 13 denotes a current absorbing circuit (current branch circuit), 11a, 12a, and 13a each denote a current switch circuit, 11b, 12b, and 13b each denote a voltage to current converter, 14 denotes an automatic power control circuit, 16 denotes a controller, 17a, 17b, and 17c each denote a digital to analog converter, 17d denotes an analog to digital converter, and 18 denotes a control signal generation circuit.

The second current supply circuit 11 and the first current supply circuit 12 are connected in parallel to the laser diode LD for supplying a current to the laser diode LD, and the current to voltage converter 10 and the current branch circuit 13 are connected in parallel to the photodiode PD for passing therethrough a part (or the whole) of the current from the photodiode PD. The current switch circuit 11a is connected in series between the voltage to current converter 11b and the laser diode LD, the current switch circuit 12a is connected in series between the voltage to current converter 12b and the laser diode LD, and the current switch circuit 13a is connected in series between the voltage to current converter 13b and the laser diode LD. The current switch circuit 11a and the voltage to current converter 11b form the second current supply circuit 11, the current switch circuit 12a and the voltage to current converter 12b form the first current supply circuit 12, and the current switch circuit 13a and the voltage to current converter 13b form the current branch circuit 13.

The control signal generation circuit 18 generates control signals for controlling the operations of the current switch circuits 11a, 12a, and 13a, based on control signals which are supplied from the controller 16, as explained later.

When reading data, only the current from the first current supply circuit 12 is supplied to the laser diode LD. Namely, the voltage to current converter 12b is supplied to the laser diode LD after being modulated in the current switch circuit 12a as explained later. When writing data, both the above current from the first current supply circuit 12 and the current from the second current supply circuit 11 are supplied to the laser diode LD. Namely, the current from the voltage to current converter 11b is supplied through the current switch circuit 11a to the laser diode LD, in parallel with the the above current from the first current supply circuit 12.

Figure 1:
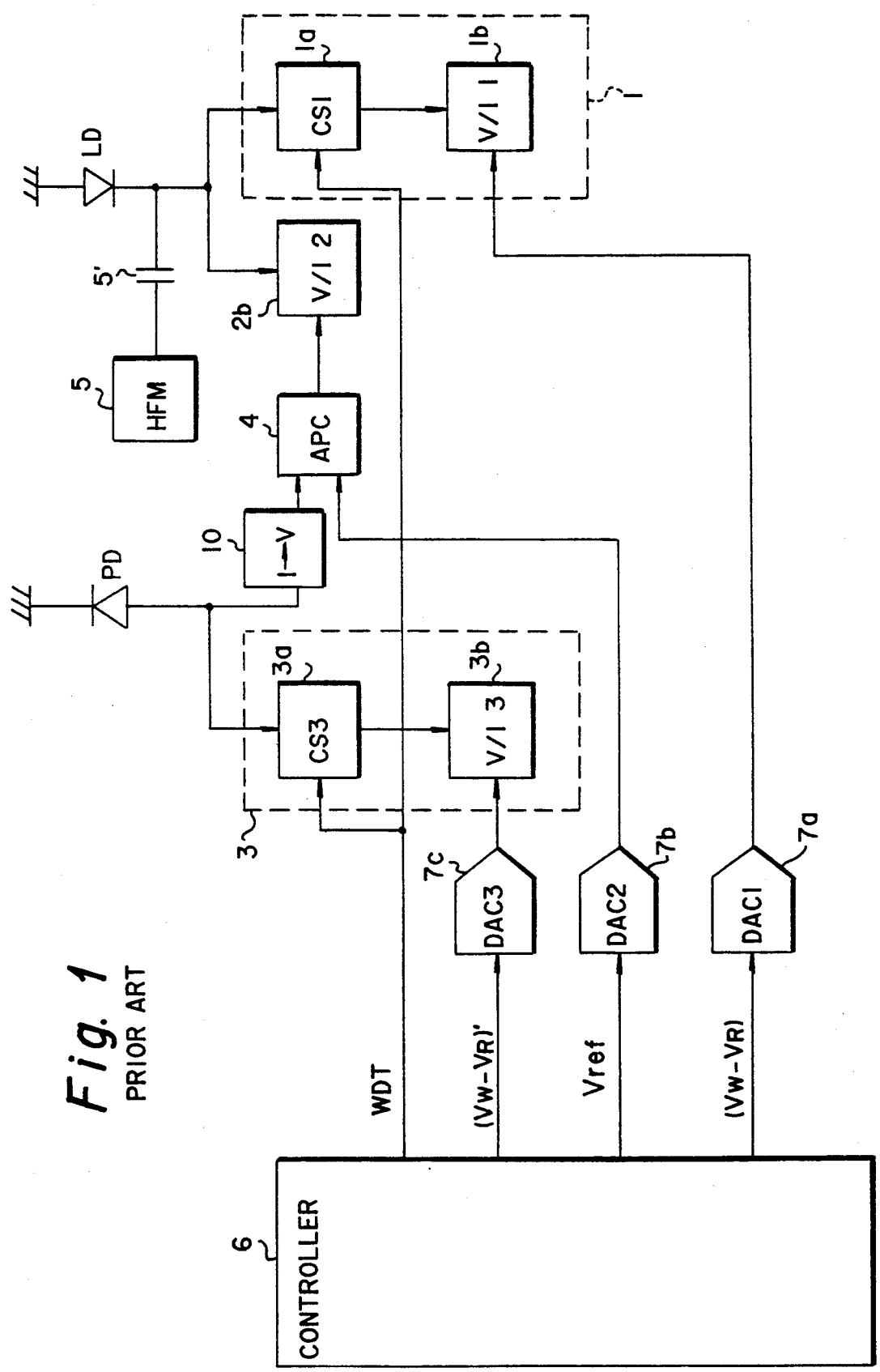
FIG. 1 shows a construction of a conventional power supply circuit for supplying an electric power to a laser diode for writing and reading digital data on an optical memory medium which is used in the conventional optical memory device.
Figure 2:
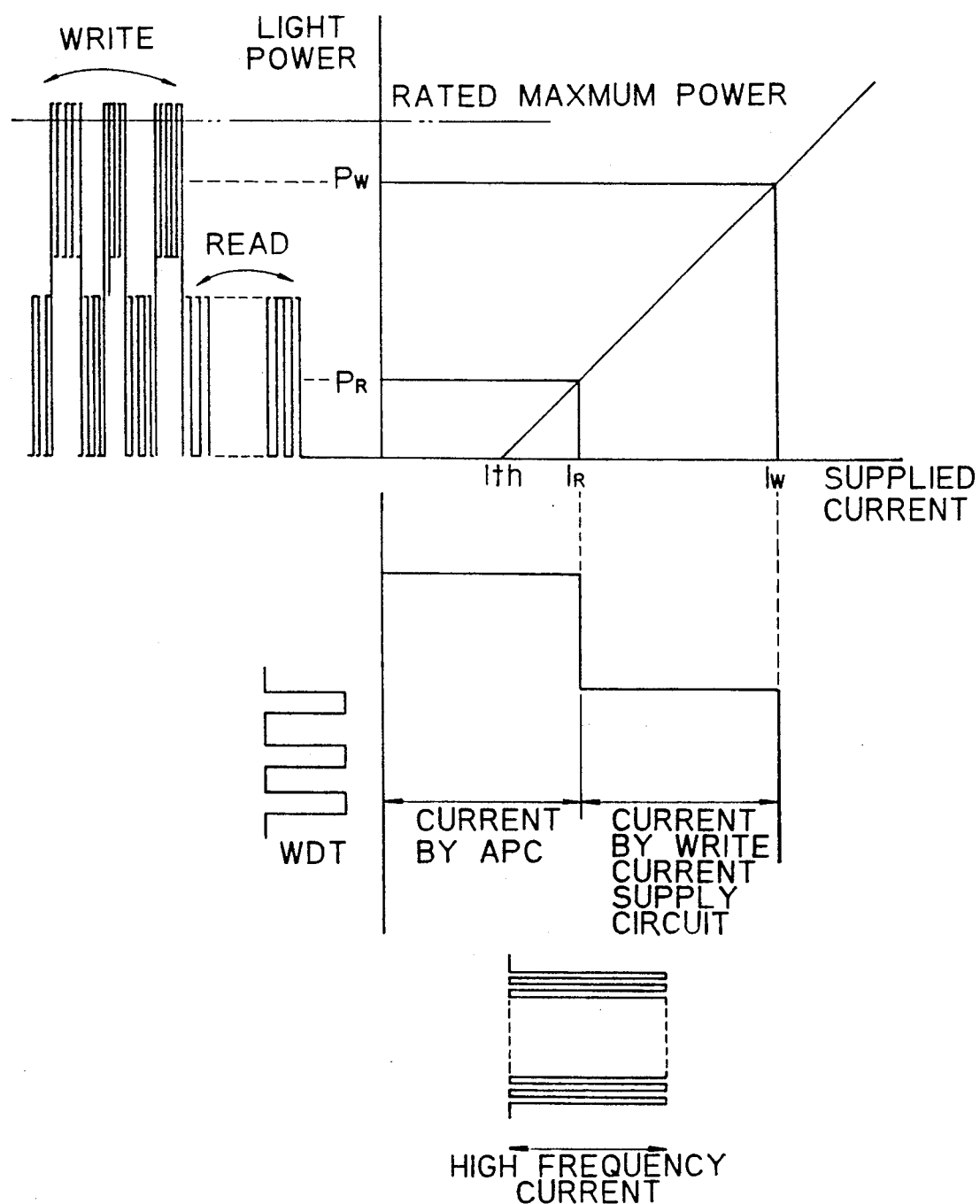
FIG. 2 shows the operation of the power supply circuit of FIG. 1.
Figure 3:
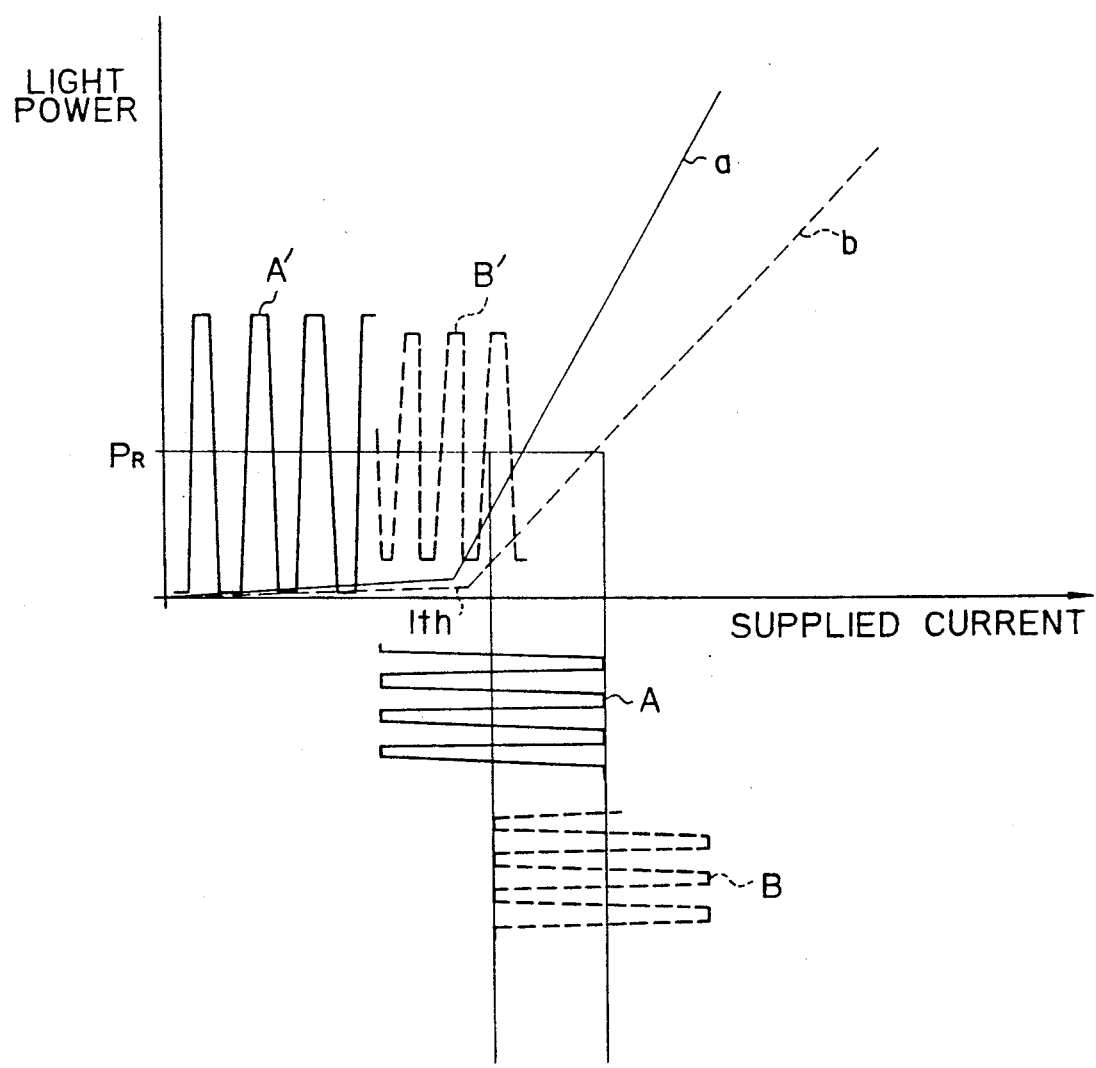
FIG. 3 shows examples of the powers of the lights which are emitted from two different laser diodes (or the same laser diode before and after the characteristics change) which have different characteristics from each other in the conventional power supply circuit as shown in FIG. 1.

The construction and the operation of the laser diode LD, the current branch circuit 13, and the current to voltage converter 10, are the same as the corresponding construction in FIG. 1. Similar to the construction of FIG. 1, the current branch circuit 13 operates when writing data, and a part of the current flowing through the photodiode PD corresponding to the difference between the current flowing through the laser diode LD when writing data and the average current flowing through the laser diode LD when reading data, flows in the current branch circuit 13 when writing data. The average of the current input to the current to voltage converter 10 is equal to the average current component flowing through the photodiode PD and corresponding to the current which is supplied from the first current supply circuit 12 to the laser diode LD. The current to voltage converter 10 outputs a voltage corresponding to the average of the current input, and the output of the current to voltage converter 10 is applied in parallel to the automatic power control circuit 14 and the analog to digital converter 17d. The controller 16 monitors the intensity of the light emitted from the laser diode LD, through the digital to analog converter 7d.

The controller 16 sets through the digital to analog converter 17a, a control voltage $V_W - V_R$ corresponding to an output current level of the voltage to current converter 11b, in the voltage to current converter 11b, sets through the digital to analog converter 17c a control voltage $(V_W - V_R)'$ corresponding to a current level in the voltage to current converter 13b, in the voltage to current converter 13b, and supplies a reference voltage $V_{ref}$ through the digital to analog converter 17b to the automatic power control circuit 14.

The automatic power control circuit 14 comprises an integrating error amplifier, further receives the reference voltage $V_{ref}$ from the digital to analog converter 17b, and compares the above voltage from the current to voltage converter 10 with the reference voltage $V_{ref}$ to obtain an average error voltage (average difference between the output of the current to voltage converter 10 and the reference voltage $V_{ref}$). Then, the above-mentioned control voltage the amount of which corresponds to the above average error voltage, is supplied to the voltage to current converter 12b, and therefore the current which is supplied from the voltage to current converter 12b (the first current supply circuit 12) to the laser diode LD is controlled so that the average power of a portion of the light which is emitted from the laser diode LD due to the current from the first current supply circuit 12 is maintained at a constant value which is determined by the above reference voltage $V_{ref}$ for supplying to the laser diode LD a current which is required for emitting light for reading data.

Figure 5:
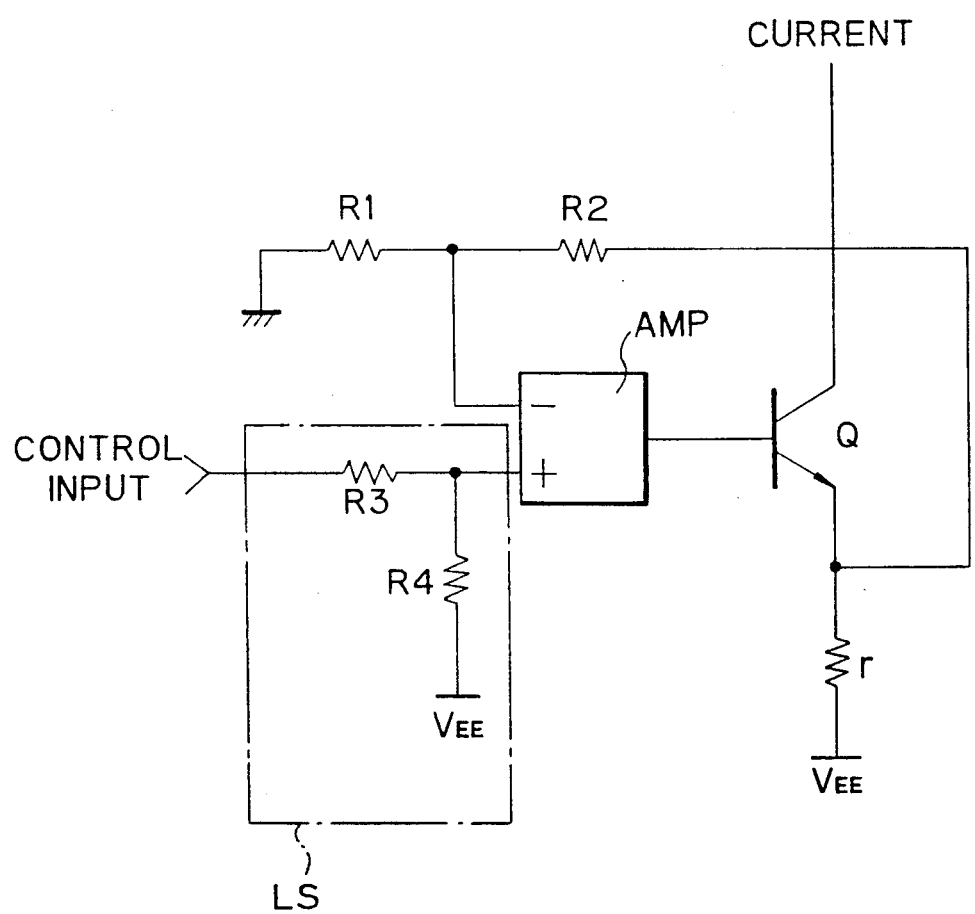
FIG. 5 shows an example of the construction of the voltage to current converters in FIG. 4.

An example of the construction of each of the voltage to current converters 11b, 12b, and 13b is shown in FIG. 5. In the construction of FIG. 5, reference numeral LS denotes a level shift circuit, AMP denotes an operational amplifier, R1, R2, R3, R4, and r each denote a resistor, Q denotes an (NPN-type) transistor, and $V_{EE}$ denotes a voltage source. In the construction of FIG. 5, when a control input is input, the voltage level of the input is shifted in the level shift circuit LS, and is then applied to the positive input terminal of the amplifier AMP. The output of the operational amplifier AMP is applied to the base terminal of the transistor Q. The emitter terminal of the transistor Q is connected through a resistor r to the voltage source VEE, and is in parallel to the negative input terminal of the operational amplifier AMP through the resistor R3. The current $I_{out}$ by the input control voltage $V_{in}$ from the construction of FIG. 5, is expressed as follows.

$$I_{out} = (V_{in} \cdot R2)/(R1 \cdot r)$$

Thus, a constant current source the output current of which can be controlled by the control input is realized.

An example of the construction of each of the current switches 11a, 12a, and 13a is shown in FIG. 6. In the construction of FIG. 6, reference numerals Q1 and Q2 each denote a transistor. A current the flow of which is to be controlled by the current switch, is input from the collector terminal of the transistor Q1, the emitter terminals of the transistors Q1 and Q2 are connected, and the current is output from the emitter terminal of the transistor Q1. A control input which is comprised of a pair of digital signals which are logically opposite to each other, controls the flow of the current, and the pair of digital signals are applied to the base terminals A and B of the transistors Q1 and Q2, respectively. Thus, when an active signal is applied to the terminal A and an inactive signal is applied to the terminal B, the current switch is ON, i.e., the current flows through the transistor Q1. Or when an inactive signal is applied to the terminal A and an active signal is applied to the terminal B, the current switch is OFF, i.e., the current does not flow through the transistor Q2.

An example of the construction of the current to voltage converter 10 is shown in FIG. 7. In the construction of FIG. 7, reference numeral 60 denotes an operational amplifier, and 61 denotes a variable resistor. A current input is applied to a negative input terminal of the operational amplifier 60, and the positive input terminal of the operational amplifier 60 is connected to a voltage source of a voltage $V_{EE}/2$. The output terminal of the operational amplifier 60 is connected to the input terminal of the operational amplifier 60 through the variable resistor 61. By the construction of FIG. 7, when the current flows the variable resistor 61, the output voltage of the operational amplifier 60 rises according to the current, and therefore, the current is converted to the voltage.

An example of the construction of the automatic power control circuit 14 is shown in FIG. 8. In the construction of FIG. 8, reference numeral 62 denotes a level shift circuit, 63 denotes an integrating error amplifier, and 64 denotes an analog switch. A reference input is input into the level shift circuit 62, and the voltage level of the reference input is shifted, and is applied to the positive input terminal of the integrating error amplifier 63. A monitored current is applied to the negative input terminal of the integrating error amplifier 63, and the output of the integrating error amplifier 63 is applied to one of two input terminals of the analog switch 64. In the construction of FIG. 8, the difference between the monitored current and the level shifted reference input is integrated to obtain an average error (difference) voltage. In a normal operation, the average error voltage is output as a control voltage to maintain an average power of light emitted from the laser diode to a level which is determined by the reference input.

Figure 9:
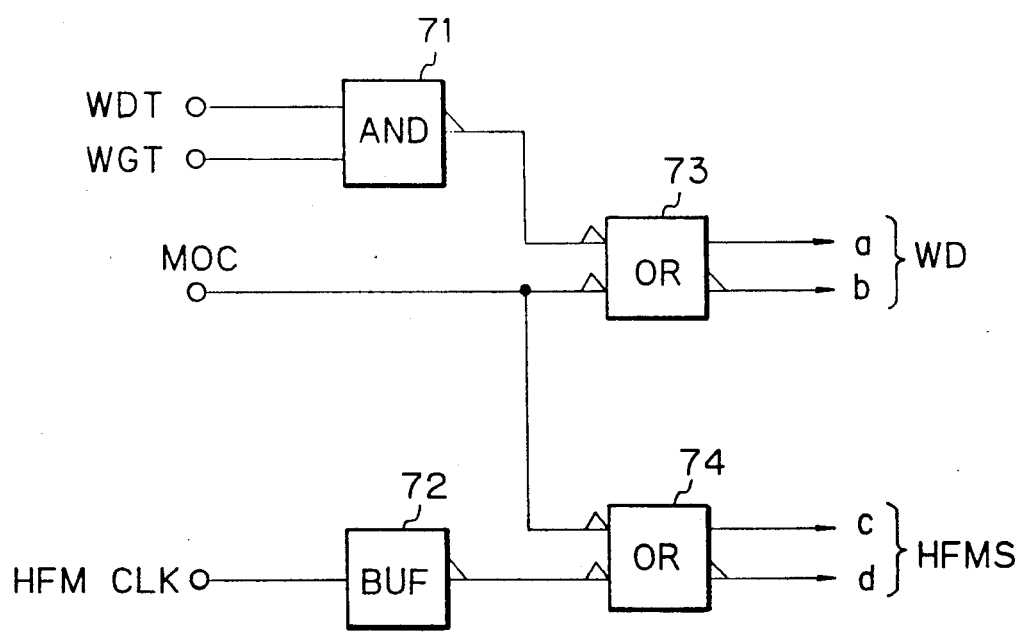
FIG. 9 shows the construction of the control signal generation circuit 18 of FIG. 4 in the first embodiment of the present invention.

FIG. 9 shows the construction of the control signal generation circuit 18 of FIG. 4 in the first embodiment of the present invention. In FIG. 9, reference numeral 71 denotes an AND circuit, 72 denotes a buffer circuit, 73 and 74 each denote an OR circuit, and WDT denotes a write data signal, WGT denotes a write gate signal, MOC denotes a mode control signal, WD denotes a write control signal, HFM CLK denotes a high frequency clock signal, and HFMS denotes a high frequency control signal. The write data signal WDT and the write gate signal WGT, which are output from the controller 16 in FIG. 4, are applied to the AND circuit 71, and the negative logic output of the AND circuit 71 and the mode control signal MOC which is output from the controller 16 in FIG. 4, are applied to the negative logic input terminals of the OR circuit 73. The OR circuit 73 outputs a positive logic output a and a negative logic output b, and the pair of the positive logic output a and the negative logic output b form the above write data signal WD. The high frequency clock signal HFM CLK is output from a high frequency clock generator which is not shown, is logically inverted in the buffer circuit 72, and is then applied to one of two negative logic input terminals of the OR circuit 74. The above mode control signal MOC is applied to the other negative logic input terminal of the OR circuit 74. The OR circuit 74 outputs a positive logic output c and a negative logic output d, and the pair of the positive logic output c and the negative logic output d form the above high frequency control signal HFMS.

FIGS. 10 and 11 show the operations of the above control signal generation circuit of FIG. 9 in the first embodiment of the present invention. FIG. 10 shows the timing of the signals during successive data write operation. The controller 16 maintains the output level of the write gate signal WGT active during successive data write operations, and makes the output level of the write data signal WDT active at a time when a light beam is focused on each location where a bit "1" is to be written on a track of an optical medium. The mode control signal MOC is maintained active during a normal operation. The mode control signal MOC is made inactive when the current supply circuit is adjusted as explained later. The above signal a of the write control signal WD changes its state in the same timing as the write data signal WDT when the mode control signal MOC is active, as shown in FIG. 10. In addition, when the mode control signal MOC is active, the high frequency clock signal HFM CLK passes through the OR circuit 74, i.e., the signal c of the high frequency control signal HFMS changes its state in the same timing as the high frequency clock signal HFM CLK regardless of the write gate signal WGT or the write data signal WDT, as shown in FIG. 10.

FIG. 11 shows the timing of the signals during data read operation. During a data reading operation, both the write gate signal WGT and the write data signal WDT are maintained inactive. As shown in FIG. 11, the write control signal WD is maintained inactive during the data read operation, and as mentioned above, the signal c of the high frequency control signal HFMS changes its state in the same timing as the high frequency clock signal HFM CLK regardless of the write gate signal WGT or the write data signal WDT, as shown in FIG. 11.

The above write data signal WD is supplied to the current switch circuits 11a and 13a as their control inputs, where the above positive logic signal a is applied to the terminal A and the negative logic signal b is applied to the terminal B in the construction as shown in FIG. 6. The above high frequency control signal HFMS is supplied to the current switch circuits 12a as its control input, where the above positive logic signal c is applied to the terminal A and the negative logic signal d is applied to the terminal B in the construction as shown in FIG. 6.

Figure 12:
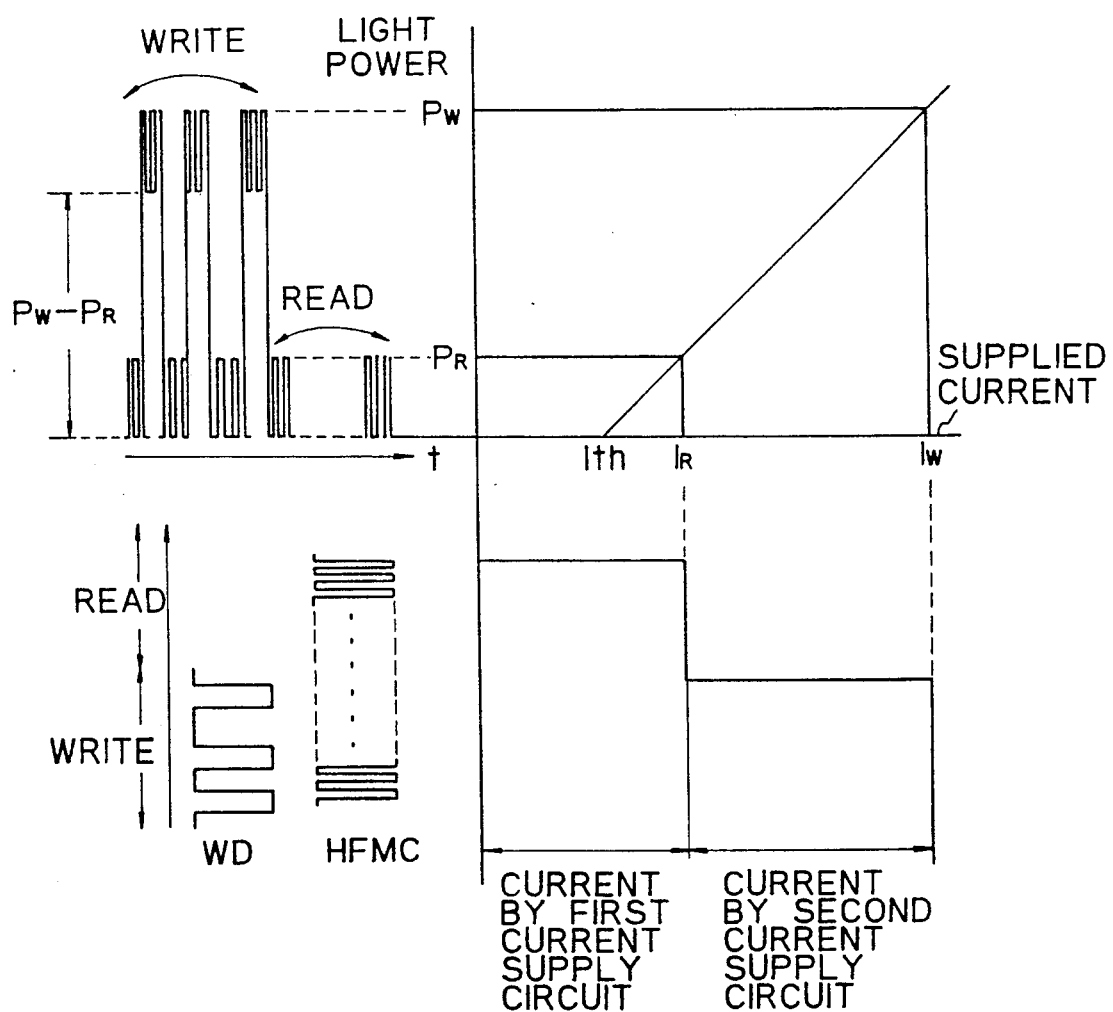
FIG. 12 shows examples of the operations of the power supply circuit of FIG. 4 in the first embodiment of the present invention.

FIG. 12 shows the operation of the power supply circuit of FIG. 4 in the first embodiment of the present invention. In FIG. 12, $I_R$ denotes the current which is output from the voltage to current converter 12b, $I_W-I_R$ denotes the current which is output from the voltage to the current converter 11b, $I_{th}$ denotes a threshold value of the current which flows in the laser diode and at which the laser diode begins to emit a light, $P_R$ denotes the maximum power level of the light which is emitted from the laser diode corresponding to the above current $I_R$, and $P_W$ denotes the maximum power level of the light which is emitted from the laser diode corresponding to the above current $I_W$.

As shown in FIG. 12, according to the above construction, the total current which is supplied from the first and second current supply circuits 12 and 11 (or from the first current supply circuit 12 only) to the laser diode LD is modulated by the high frequency control signal HFMS, where the amplitude of the modulation in the current which is supplied to the laser diode LD is equal to the above current $I_R$, i.e., the total power which is emitted from the laser diode LD is modulated by a high frequency due to the high frequency control signal HFMS, where the amplitude of the modulation in the power of light which is emitted from the laser diode LD is equal to the above power $P_R$. In the first embodiment, the high frequency modulation is constantly carried out through data writing and reading operations, and therefore, characteristics of the optical system for reading and writing data are not changed between the case of reading data and the case of writing data, and defocusing of the optical beam due to a mode hop can be avoided.

When the above write control signal WD is inactive, i.e., when reading data, the maximum level of the current which is supplied from the first current supply circuit 12 to the laser diode LD is equal to the value $I_R$, and correspondingly, the maximum power level of the light which is emitted from the laser diode LD is equal to the value $P_R$. Further, the minimum level of the current which is supplied from the first current supply circuit 12 to the laser diode LD is equal to zero, which is below the threshold value $I_{th}$, and therefore, the minimum power level of the light which is emitted from the laser diode LD is equal to zero. This zero light power appears repeatedly by the above high frequency. Thus, the aforementioned back talk noise can be effectively reduced. In addition, the high frequency modulation in the low light power improves the SN ratio in the light emitted from the laser diode.

When the above write control signal WD is active, i.e., when writing data, the maximum level of the current which is supplied from the first current supply circuit 12 to the laser diode LD is equal to the value $I_W$, and correspondingly, the maximum power level of the light which is emitted from the laser diode LD is equal to the value $P_W$. In addition, the high frequency modulation in the high light power can contribute to reducing the back talk noise when writing data.

Figure 13:
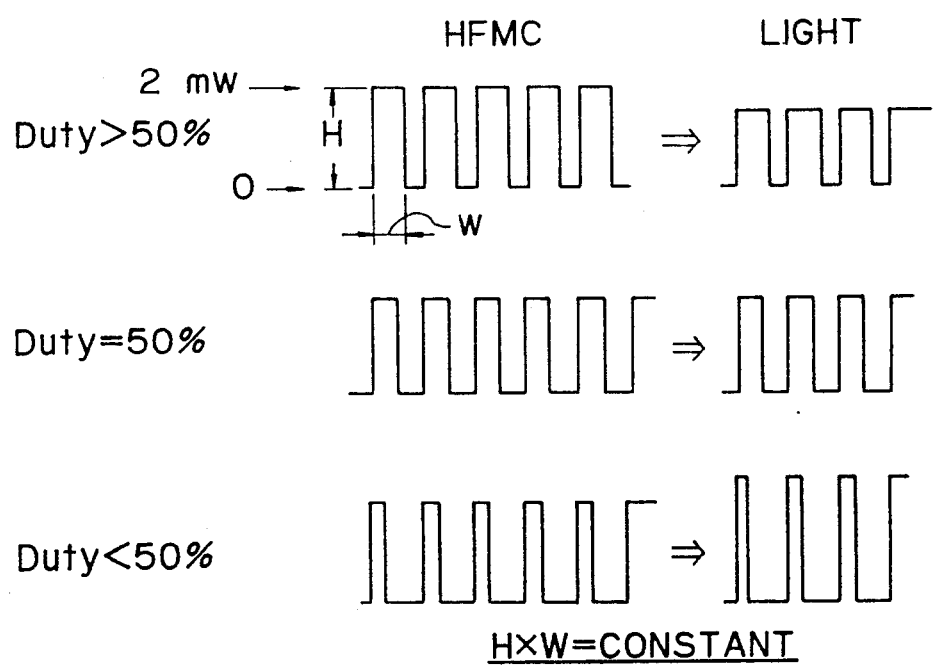
FIG. 13 shows examples of the operations of the automatic power control circuit for various duties of control pulses.

FIG. 13 shows examples of the operations of the automatic power control circuit for various duties of control pulses. As explained before, the automatic power control circuit 14 outputs a control voltage to supply to the laser diode LD an electric current which is necessary to emit a predetermined level of an average light power for reading data. Therefore, as shown in FIG. 13, the amplitude (the maximum level) of the high frequency modulation is controlled according to the pulse duty of the high frequency control signal HFMC. Namely, the amplitude of the high frequency modulation current $I_R$ is reduced when pulse widths of the high frequency control signal HFMC are large, or is increased when pulse widths of the high frequency control signal HFMC are small.

Figure 14:
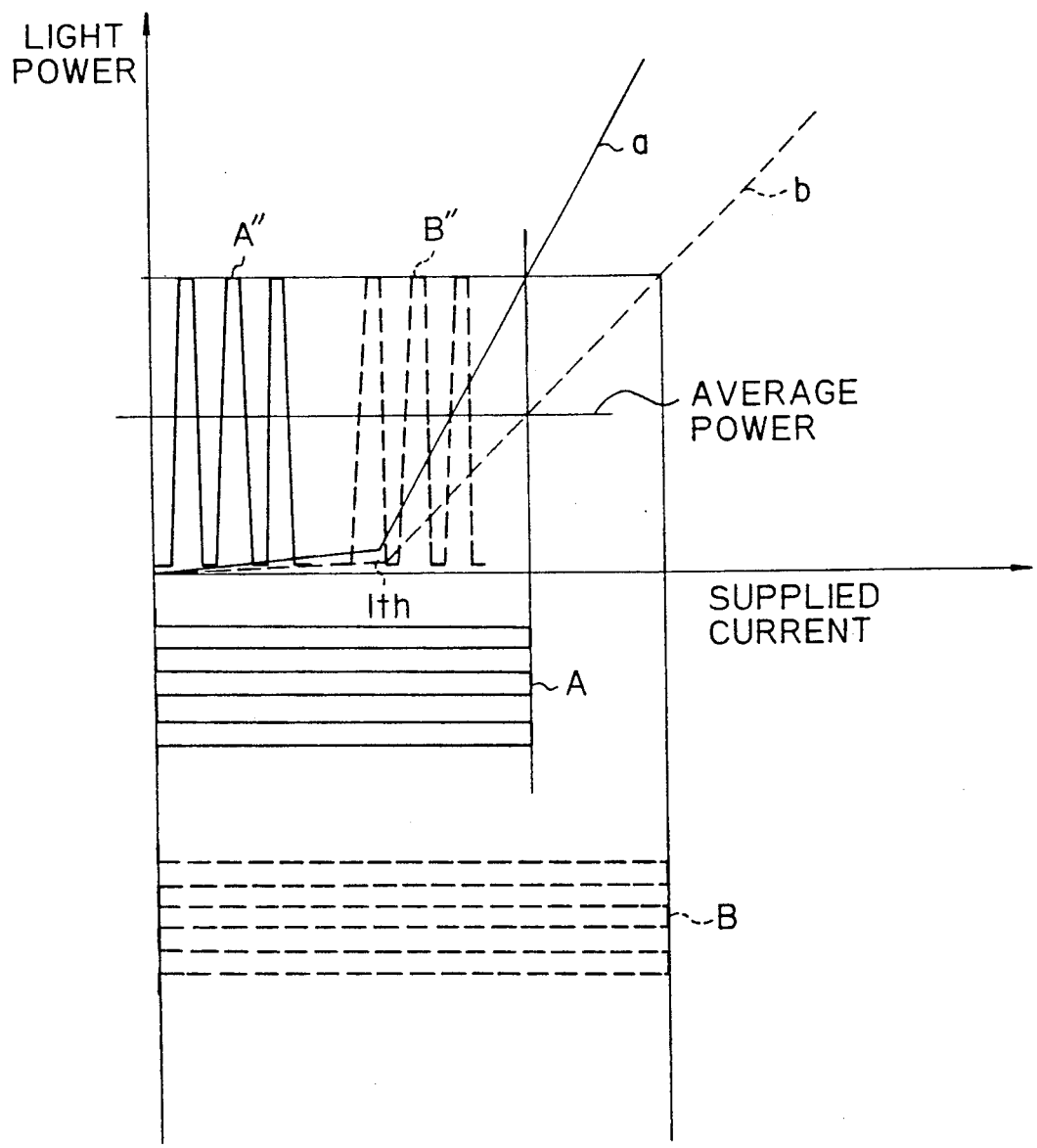
FIG. 14 shows the effect of the present invention.

The effect of the present invention is explained with reference to FIG. 14. FIG. 14 shows relationship between the current which is supplied from the first current supply circuit 12 to the laser diode LD and the power of light which is emitted from the laser diode LD. As explained above, the amplitude of the current which is supplied to the laser diode LD varies so that a predetermined level of an average light power is emitted from the laser diode LD, and therefore, the average light power is maintained at a constant value, and the minimum level of the high frequency current is zero level corresponding to the OFF state in the current switch circuit 12a, i.e., the current which is supplied from the first current supply circuit 12 to the laser diode LD, is repeatedly made to be below the threshold value $I_{th}$, and therefore, the power of light which is emitted from the laser diode LD, is repeatedly made substantially zero. In FIG. 14, a and b each denote a different characteristic curve of the laser diode LD. The above characteristics of the light power are not changed by the characteristics of the laser diode, as shown in FIG. 14.

(2) The Second Embodiment (FIGS. 4, 15 to 19)

Figure 15:
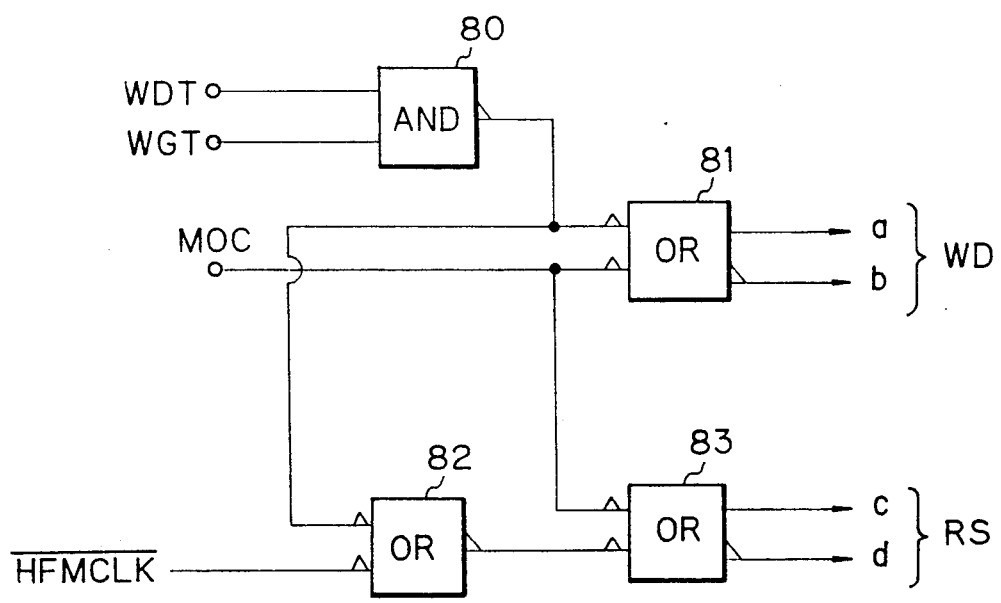
FIG. 15 shows the construction of the control signal generation circuit 18 of FIG. 4 in the second embodiment of the present invention.

The construction of FIG. 4 is also used in the second embodiment of the present invention. In the construction of the second embodiment of the present invention, the construction and the operations of the control signal generation circuit 18 is different from the first embodiment. FIG. 15 shows the construction of the control signal generation circuit 18 of FIG. 4 in the second embodiment of the present invention. In FIG. 15, reference numeral 80 denotes an AND circuit, and 81, 82 and 83 each denote an OR circuit, RS denotes an RS signal, and $\overline{\text{HFMCLK}}$ denotes a logically inverted signal of the aforementioned high frequency clock signal HFM CLK. The other references WGT, MOC, and WD each denote the same signal as in FIG. 9. The write data signal WDT and the write gate signal WGT, which are output from the controller 16 in FIG. 4, are applied to the AND circuit 80, and the negative logic output of the AND circuit 80 and the mode control signal MOC which is output from the controller 16 in FIG. 4, are applied to negative logic input terminals of the OR circuit 73. The OR circuit 73 outputs a positive logic output a and a negative logic output b, and the pair of the positive logic output a and the negative logic output b form the above write data signal WD, which is the same as the first embodiment of FIG. 9. The logically inverted high frequency clock signal $\overline{HFMCLK}$ and the negative logic output of the AND circuit 80 are applied to negative logic input terminals of the OR circuit 82. The negative logic output of the OR circuit 82 and the above mode control signal MOC are applied to negative logic input terminals of the OR circuit 83. The OR circuit 83 outputs a positive logic output c and a negative logic output d, and the pair of the positive logic output c and the negative logic output d form the above RS signal.

FIGS. 16 and 17 shows the operations of the above control signal generation circuit of FIG. 15 in the second embodiment of the present invention. FIG. 16 shows the timing of the signals during successive data write operation. The controller 16 maintains the output level of the write gate signal WGT active during successive data write operations, and makes the output level of the write data signal WDT active at a time when a light beam is focused on each location where a bit "1" is to be written on a track of an optical medium. The mode control signal MOC is maintained active during a normal operation. The mode control signal MOC is made inactive when the current supply circuit is adjusted as explained later. The above signal a of the write control signal WD changes its state in the same timing as the write data signal WDT when the mode control signal MOC is active, as shown in FIG. 16. In addition, when the mode control signal MOC is active, the signal c of the high frequency control signal HFMS changes its state in the same timing as the write control signal WD, as shown in FIG. 16.

FIG. 17 shows the timing of the signals during data read operation. During a data reading operation, both the write gate signal WGT and the write data signal WDT are maintained inactive. As shown in FIG. 17, the write control signal WD is maintained inactive during the data read operation, and as mentioned above, the signal c of the high frequency control signal HFMS changes its state in the same timing as the high frequency clock signal HFM CLK, as shown in FIG. 17.

The above write data signal WD is supplied to the current switch circuits 11a and 13a as their control inputs, where the above positive logic signal a is applied to the terminal A and the negative logic signal b is applied to the terminal B in the construction as shown in FIG. 6. The above RS signal is supplied to the current switch circuits 12a as its control input, where the above positive logic signal c is applied to the terminal A and the negative logic signal d is applied to the terminal B in the construction as shown in FIG. 6.

Figure 18:
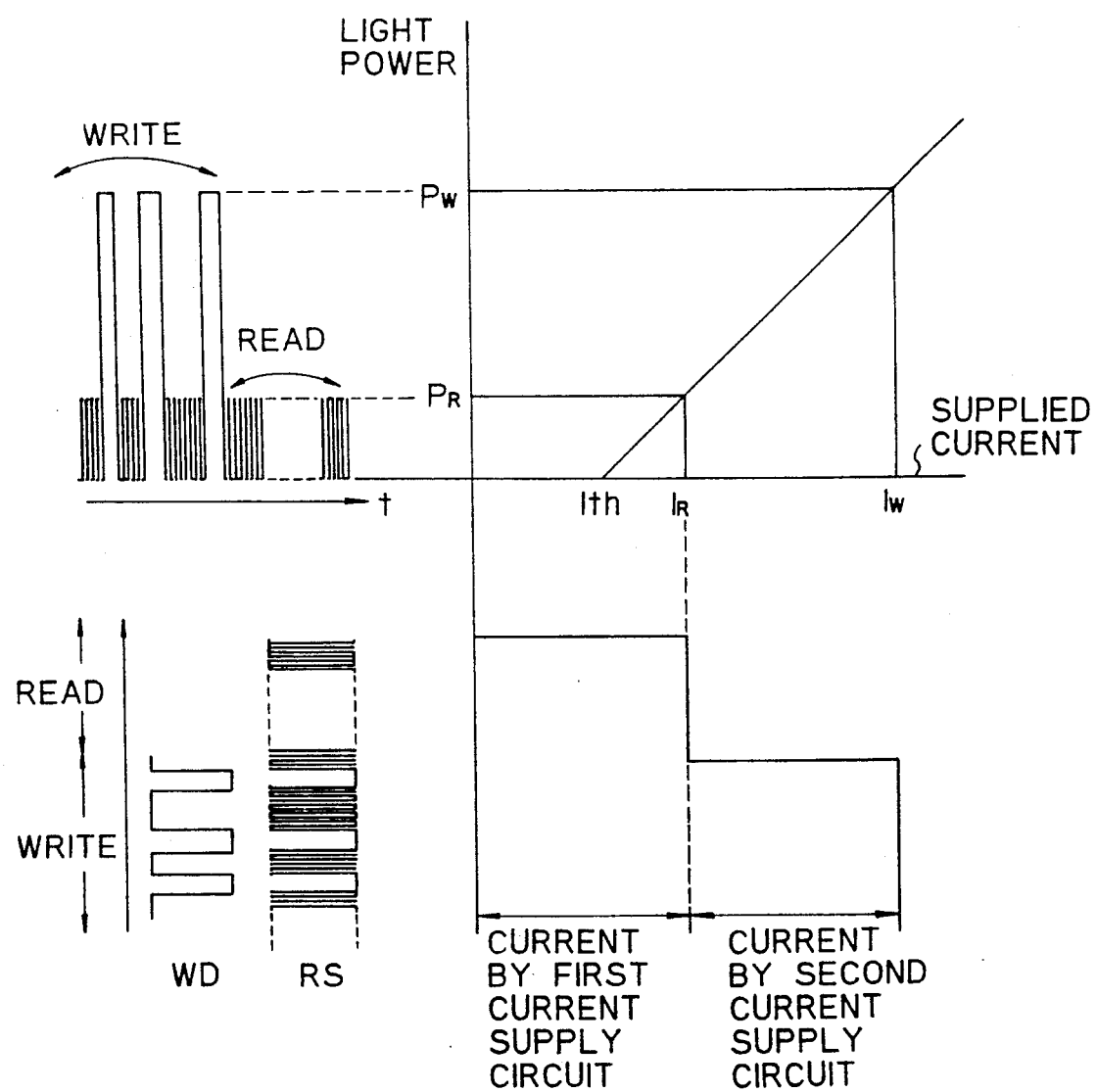
FIG. 18 shows examples of the operations of the power supply circuit of FIG. 4 in the second embodiment of the present invention.

FIG. 18 shows the operation of the power supply circuit of FIG. 4 in the second embodiment of the present invention. In FIG. 18, $I_R$ denotes the current which is output from the voltage to current converter 12b, $I_W-I_R$ denotes the current which is output from the voltage to current converter 11b, $I_{th}$ denotes the threshold value of the current which flows in the laser diode and at which the laser diode begins to emit a light, $P_R$ denotes the maximum power level of the light which is emitted from the laser diode corresponding to the above current $I_R$, and $P_W$ denotes the maximum power level of the light which is emitted from the laser diode LD corresponding to the above current $I_W$.

As shown in FIG. 18, according to the above construction, when either of the above write gate signal WGT and the write data signal WDT is inactive, i.e., the write control signal WD is inactive, the current which is supplied from the first current supply circuit 12 to the laser diode LD is modulated by the RS signal which changes in the same timing as the high frequency clock signal HFM CLK, and no current is output from the second current supply circuit 11 according to the inactive write control signal WD. Therefore, the amplitude of the modulation in the current which is supplied to the laser diode LD is equal to the above current $I_R$, and, i.e., the power which is emitted from the laser diode LD is modulated by the high frequency due to the high frequency clock signal HFM CLK, where the amplitude of the modulation in the power of light which is emitted from the laser diode LD is equal to the above power $P_R$. In the second embodiment, the high frequency modulation is carried out in data reading operations only. The minimum level of the current which is supplied from the first current supply circuit 12 to the laser diode LD is equal to zero, which is below the threshold value $I_{th}$, and therefore, the minimum power level of the light which is emitted from the laser diode LD is equal to zero. This zero level of the light power appears repeatedly due to the above high frequency. Thus, the aforementioned back talk noise can be effectively reduced. In addition, the high frequency modulation in the low light power improves the SN ratio in the light emitted from the laser diode.

When the above write gate signal WGT and the write data signal WDT are active, i.e., the write control signal WD is active, the constant current $I_R$ is supplied from the first current supply circuit 12 to the laser diode LD, and in parallel with the current $I_R$, the constant current $I_W-I_R$ is supplied from the second current supply circuit 11 to the laser diode LD. Accordingly, the maximum power level of the light which is emitted from the laser diode LD is equal to the value $P_W$. Since the high frequency modulation is not carried out during the data write operation in the second embodiment, a required average light power is obtained using a laser diode of a relatively low rated maximum power level, without an excess of the output level of the laser diode over the rated maximum level.

Figure 20:
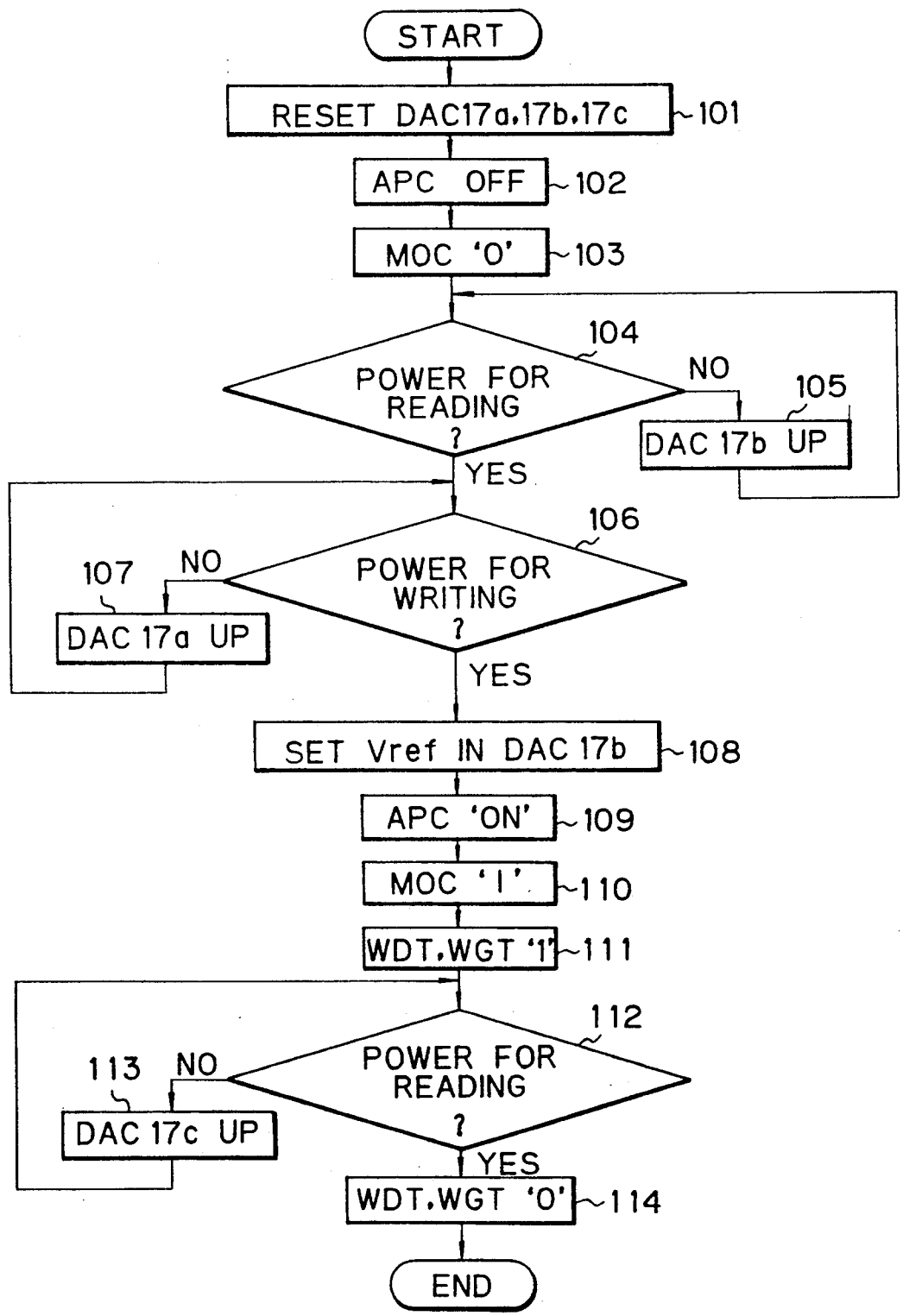
FIG. 20 is a flowchart showing an adjusting operation of the power supply circuit in the first and second embodiments of the present invention.

(3) Adjustment of the Power Supply Circuit in the First and Second Embodiments (FIG. 20)

FIG. 20 is a flowchart showing an adjusting operation of the power supply circuit in the first and second embodiments of the present invention.

In the step 101, the digital to analog converters 17a, 17b, and 17c are reset. In the step 102, the controller 16 makes the automatic power control circuit 14 OFF, i.e., makes the analog switch 64 select the output of the level shift circuit 62 in the construction of FIG. 8. Thus, the controller 16 directly controls the voltage to current converter 12b without the automatic power control loop. In the step 103, the controller 16 makes the mode control signal MOC at the low level for adjusting the current supply circuit. By the above setting, both the write control signal WD, and the high frequency control signal HFMS in the first embodiment or the RS signal in the second embodiment, are maintained at the high level, and therefore, the current switch circuits 11a, 12a, and 13a are made ON.

In the steps 104 and 105, the controller 16 increments the input value to the digital to analog converter 17b (to the voltage to current converter 12b) until the current through the photodiode PD reaches a current corresponding to a predetermined maximum level of the light power $P_R$ for reading data, while monitoring the current through the photodiode PD by the output of the analog to digital converter 17d, and then fixes the input to the digital to analog converter 17b at the value corresponding to the predetermined power $P_R$.

In the steps 106 and 107, upon the above setting of the analog to digital converter 17b, the controller 16 increments the input value to the digital to analog converter 17a (to the voltage to current converter 11b) until the current through the photodiode PD reaches a predetermined level of the current corresponding to the light power $P_W$ for writing data, while monitoring the current through the photodiode PD by the output of the analog to digital converter 17d, and then fixes the input to the digital to analog converter 17a at the value corresponding to the predetermined power $P_W$.

In the step 108, the controller 16 changes the input to the digital to analog converter 17b to a predetermined value $V_{ref}$ is to be used for making the laser diode LD emit an average light power $P_R/2$ under the automatic power control, and then makes the automatic power control circuit 14 ON in the step 109, i.e., makes the analog switch 64 to select the output of the integrating error amplifier 63 in the construction of FIG. 8.

In the step 110, the controller 16 makes the mode control signal MOC at the high level, and in the step 111, makes the write gate signal WGT and the write data signal WDT at the high level. Thus, the write control signal WD becomes the high level, and therefore, the current switch circuits 11a and 13a are made ON. In addition, in the first embodiment, the high frequency control signal HFMS changes with the high frequency, and therefore, the current switch circuit 12a is controlled to ON and OFF according to the high frequency control signal HFMS in the first embodiment. Or, in the second embodiment, the RS signal is maintained at the high level, and therefore, the current switch circuit 12a is maintained to be ON.

In the steps 112 and 113, the controller 16 increments the input value to the digital to analog converter 17c (to the voltage to current converter 13b) until the current which is monitored through the analog to digital converter 17d reaches a current corresponding to the predetermined maximum level of the light power $P_R$ for reading data, while monitoring the current through the photodiode PD by the output of the analog to digital converter 17d, and then fixes the input to the digital to analog converter 17c at the value corresponding to the predetermined power $P_R$.

Finally, in the step 114, the controller 16 makes the write gate signal WGT and the write data signal WDT at the low level to complete the adjusting operation.

(4) The Third Embodiment (FIG. 21 to 25)

Figure 19:
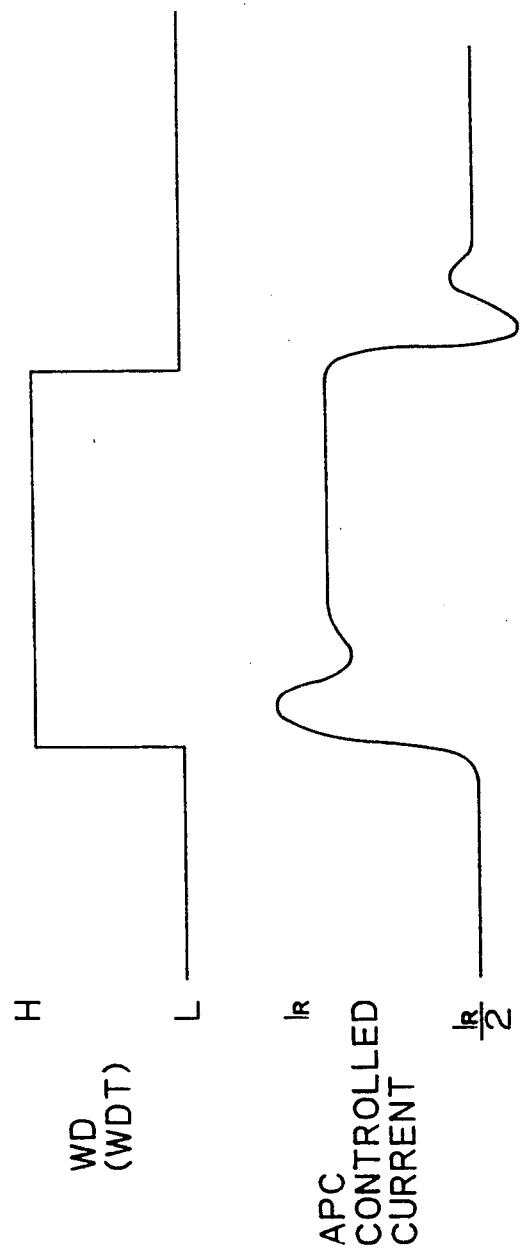
FIG. 19 shows an unstable transient in the current which is controlled by the automatic power control circuit 14 when the write data signal WDT (the write control signal WD) changes between the active state and the inactive state.

In the second embodiment, the average current which is supplied from the first current supply circuit 12 is $I_R/2$ when the above write gate signal WGT is inactive, and the average current which is supplied from the first current supply circuit 12 is $I_R$ when the above write gate signal WGT is active. Therefore, the target current value in the automatic power control circuit 24b, changes when the write control signal WD changes between the active state and the inactive state. This change causes an unstable transient state in the current which is controlled by the automatic power control circuit 24b when the write control signal WD changes between the active state and the inactive state, as shown in FIG. 19.

To eliminate the above problem of the transient state, the third embodiment is provided as follows.

Figure 21:
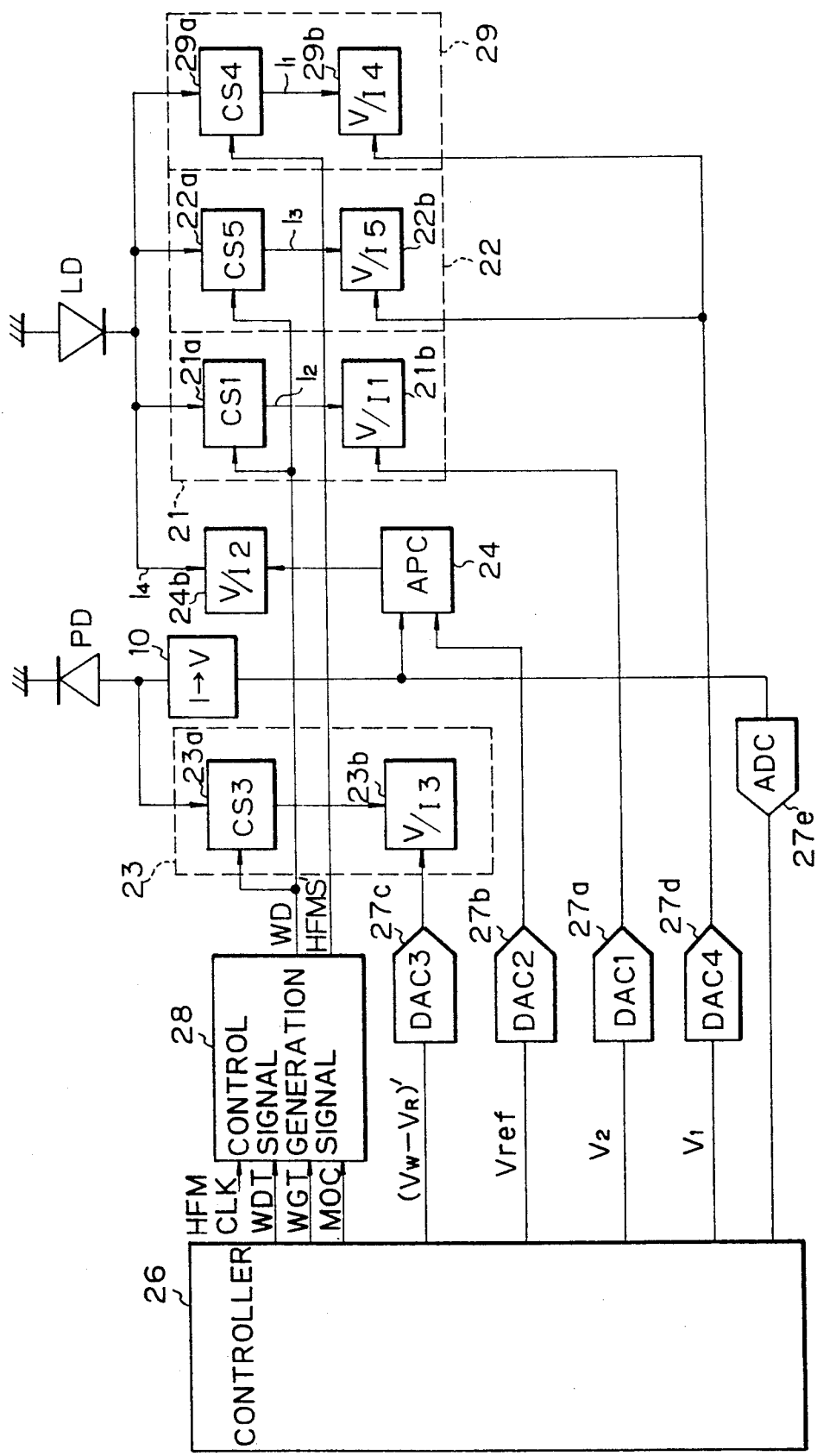
FIG. 21 is a block diagram of the construction used in the third embodiment of the present invention.

FIG. 21 is a block diagram of the construction used in the third embodiment of the present invention. In FIG. 21, the laser diode LD, the photodiode PD, and the current to voltage converter 10 are each the same as the corresponding component in the construction of FIG. 4, and reference numeral 29 denotes a first current supply circuit, 21 denotes a second current supply circuit, 22 denotes a third current supply circuit, 23 denotes a current absorbing circuit (current branch circuit), 21a, 22a, 23a, and 29a each denote a current switch circuit, 21b, 22b, 23b, 24b, and 29b each denote a voltage to current converter, 24 denotes an automatic power control circuit, 26 denotes a controller, 27a, 27b, 27c, and 27d each denote a digital to analog converter, 27e denotes an analog to digital converter, and 28 denotes a control signal generation circuit.

The first, second, and third current supply circuits 29, 21, and 22, and the voltage to current converter 24b are connected in parallel to the laser diode LD for supplying a current to the laser diode. In FIG. 21, the current which is supplied to the laser diode LD from the first current supply circuit 29 is denoted by $I_1$, the current which is supplied to the laser diode LD from the second current supply circuit 21 is denoted by $I_2$, the current which is supplied to the laser diode LD from the third current supply circuit 22 is denoted by $I_3$, and the current which is supplied to the laser diode LD from the voltage to current converter 24b is denoted by $I_4$. Similar to the first and second embodiments as shown in FIG. 4, the current to voltage converter 10 and the current branch circuit 23 are connected in parallel to the photodiode PD for passing therethrough a part (or the whole) of the current from the photodiode PD.

The current switch circuit 29a is connected in series between the voltage to current converter 29b and the laser diode LD, the current switch circuit 21a is connected in series between the voltage to current converter 21b and the laser diode LD, the current switch circuit 22a is connected in series between the voltage to current converter 22b and the laser diode LD, and the current switch circuit 23a is connected in series between the voltage to current converter 23b and the laser diode LD. The current switch circuit 29a and the voltage to current converter 29b form the first current supply circuit 29, the current switch circuit 21a and the voltage to current converter 21b form the second current supply circuit 21, the current switch circuit 22a and the voltage to current converter 22b form the third current supply circuit 22, and the current switch circuit 23a and the voltage to current converter 23b form the current branch circuit 23.

The control signal generation circuit 28 generates control signals for controlling the operations of the current switch circuits 29a, 21a, 22a, and 23a, based on control signals which are supplied from the controller 26, as explained later.

The voltage to current converter 24b constantly supplies to the laser diode LD a current the level of which is equal to the aforementioned threshold level $I_{th}$ under the control of the automatic power control circuit 24. When reading data, the current from the first current supply circuit 29 is supplied to the laser diode LD in addition to the above current from the voltage to current converter 24b. Namely, the voltage to current converter 29b is supplied to the laser diode LD after being modulated in the current switch circuit 29a as explained later. When writing data, both the current from the second current supply circuit 21 and the current from the third current supply circuit 22 are supplied to the laser diode LD in addition to the above current from the voltage to current converter 24b. Namely, both the current from the voltage to current converter 21b through the current switch circuit 21a and the current from the voltage to current converter 21b through the current switch circuit 21a are supplied to the laser diode LD, in parallel with the the above current from the voltage to current converter 24b.

The construction and the operation of the laser diode LD, the current branch circuit 23, and the current to voltage converter 10, are the same as the corresponding construction in FIG. 4. Similar to the construction of FIG. 4, the current branch circuit 23 operates when writing data, and a part of the current flowing through the photodiode PD corresponding to the difference between the current flowing through the laser diode LD when writing data and the average current flowing through the laser diode LD when reading data, flows in the current branch circuit 13 when writing data. The average of the current input to the current to voltage converter 10 is equal to the average current component flowing through the photodiode PD and corresponds to the current which is supplied from the first current supply circuit 12 to the laser diode LD. The current to voltage converter 10 outputs a voltage corresponding to the average of the current input, and the output of the current to voltage converter 10 is applied in parallel to the automatic power control circuit 24 and the analog to digital converter 27e. The controller 26 monitors the intensity of the light emitted from the laser diode LD, through the digital to analog converter 27e.

The controller 26 sets through the digital to analog converter 27aa control voltage $V_2$ corresponding to an output current level $I_2$ of the voltage to current converter 21b, sets through the digital to analog converter 27d a control voltage $V_1$ corresponding to an output current level $I_1$ of the voltage to current converter 29b and corresponding to an output current level $I_2$ of the voltage to current converter 22b, sets through the digital to analog converter 27c a control voltage $(V_W-V_R)'$ corresponding to a current level in the voltage to current converter 23b, and supplies a reference voltage $V_{ref}$ through the digital to analog converter 27b to the automatic power control circuit 24. The voltage to current converters 22b and 29b have different voltage to current conversion characteristics from each other, i.e., the voltage to current converter 22b converts the above control voltage $V_1$ to the above current $I_1$, and the voltage to current converter 22b converts the above control voltage $V_1$ to the above current $I_3$. The conversion characteristics of the voltage to current converters can be varied by suitably setting the resistance values of the aforementioned resistors in the construction of FIG. 5.

The automatic power control circuit 24 comprises an integrating error amplifier, receives the reference voltage $V_{ref}$ from the digital to analog converter 27b, and compares the above voltage from the current to voltage converter 10 with the reference voltage $V_{ref}$ to obtain an average error voltage (average difference between the output of the current to voltage converter 10 and the reference voltage $V_{ref}$). Then, the above-mentioned control voltage the amount of which corresponds to the above average error voltage, is supplied to the voltage to current converter 12b, and therefore the current which is supplied from the voltage to current converter 24b to the laser diode LD is controlled so that the average power of a portion of the light which is emitted from the laser diode LD due to the current from the voltage to current converter 24b is maintained at a constant value which is determined by the above reference voltage $V_{ref}$ for supplying to the laser diode LD a current which is required when just beginning to emit light.

The construction of each of the voltage to current converters 29b, 21b, 22b, 23b, and 24b is, for example, as shown in FIG. 5, the construction of each of the current switches 29a, 21a, 22a, and 23a is, for example, as shown in FIG. 6, the construction of the current to voltage converter 10 is, for example, as shown in FIG. 7, and the construction of the automatic power control circuit 24 is, for example, as shown in FIG. 8.

Figure 22:
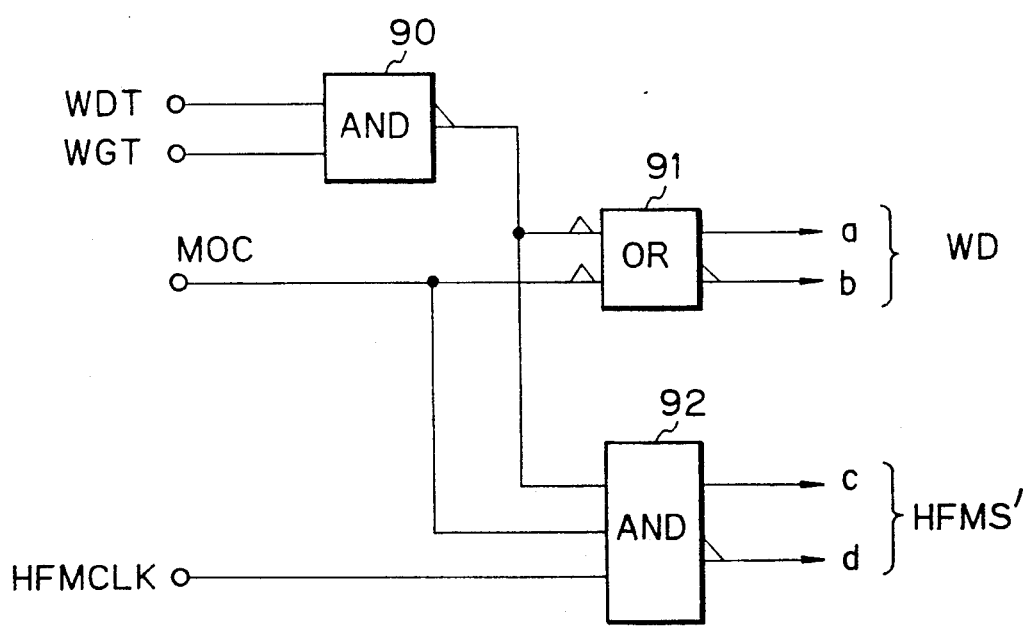
FIG. 22 shows the construction of the control signal generation circuit of FIG. 21 in the third embodiment of the present invention.

FIG. 22 shows the construction of the control signal generation circuit 28 of FIG. 21 in the third embodiment of the present invention. In FIG. 22, reference numerals 90 and 92 each denote an AND circuit, 91 denotes an OR circuit, and HFMS' denotes a high frequency control signal. The other references WGT, MOC, HFM CLK, and WD respectively denote the same signals as in FIG. 9. The write data signal WDT and the write gate signal WGT, which are output from the controller 26 in FIG. 21, are applied to the AND circuit 90, and the negative logic output of the AND circuit 90 and the mode control signal MOC which is output from the controller 26 in FIG. 21, are applied to negative logic input terminals of the OR circuit 91. The OR circuit 91 outputs a positive logic output a and a negative logic output b, and the pair of the positive logic output a and the negative logic output b form the above write data signal WD, which is the same as the first and second embodiments of FIGS. 9 and 15. The high frequency clock signal HFM CLK, the negative logic output of the AND circuit 90, and the mode control signal are applied to input terminals of the AND circuit 92. The AND circuit 92 outputs a positive logic output c and a negative logic output d, and the pair of the positive logic output c and the negative logic output d form the above HFMS' signal.

FIGS. 23 and 24 shows the operations of the above control signal generation circuit of FIG. 22 in the third embodiment of the present invention. FIG. 23 shows the timing of the signals during successive data write operation. The controller 26 maintains the output level of the write gate signal WGT active during successive data write operations, and makes the output level of the write data signal WDT active at a time when a light beam is focused on each location where a bit "1" is to be written on a track of an optical medium. The mode control signal MOC is maintained active during a normal operation. The mode control signal MOC is made inactive when the current supply circuit is adjusted as explained later. The above signal a of the write control signal WD changes its state in the same timing as the write data signal WDT when the mode control signal MOC is active, as shown in FIG. 23. In addition, when both the write gate signal WGT and the write data signal WDT are active, the high frequency clock signal HFM CLK does not pass through the AND circuit 92, i.e., the signals c and d of the high frequency control signal HFMS' is maintained at the low (L) level, as shown in FIG. 23.

FIG. 24 shows the timing of the signals during data read operation. During a data reading operation, both the write gate signal WGT and the write data signal WDT are maintained inactive. As shown in FIG. 24, the write control signal WD is maintained inactive during the data read operation, and the signal c of the high frequency control signal HFMS' changes its state in the same timing as the high frequency clock signal HFM CLK, as shown in FIG. 24.

The above write data signal WD is supplied to the current switch circuits 21a, 22a and 23a as their control inputs, where the above positive logic signal a is applied to the terminal A and the negative logic signal b is applied to the terminal B in the construction as shown in FIG. 6. The above high frequency control signal HFMS' is supplied to the current switch circuits 29a as its control input, where the above positive logic signal c is applied to the terminal A and the negative logic signal d is applied to the terminal B in the construction as shown in FIG. 6.

Figure 25:
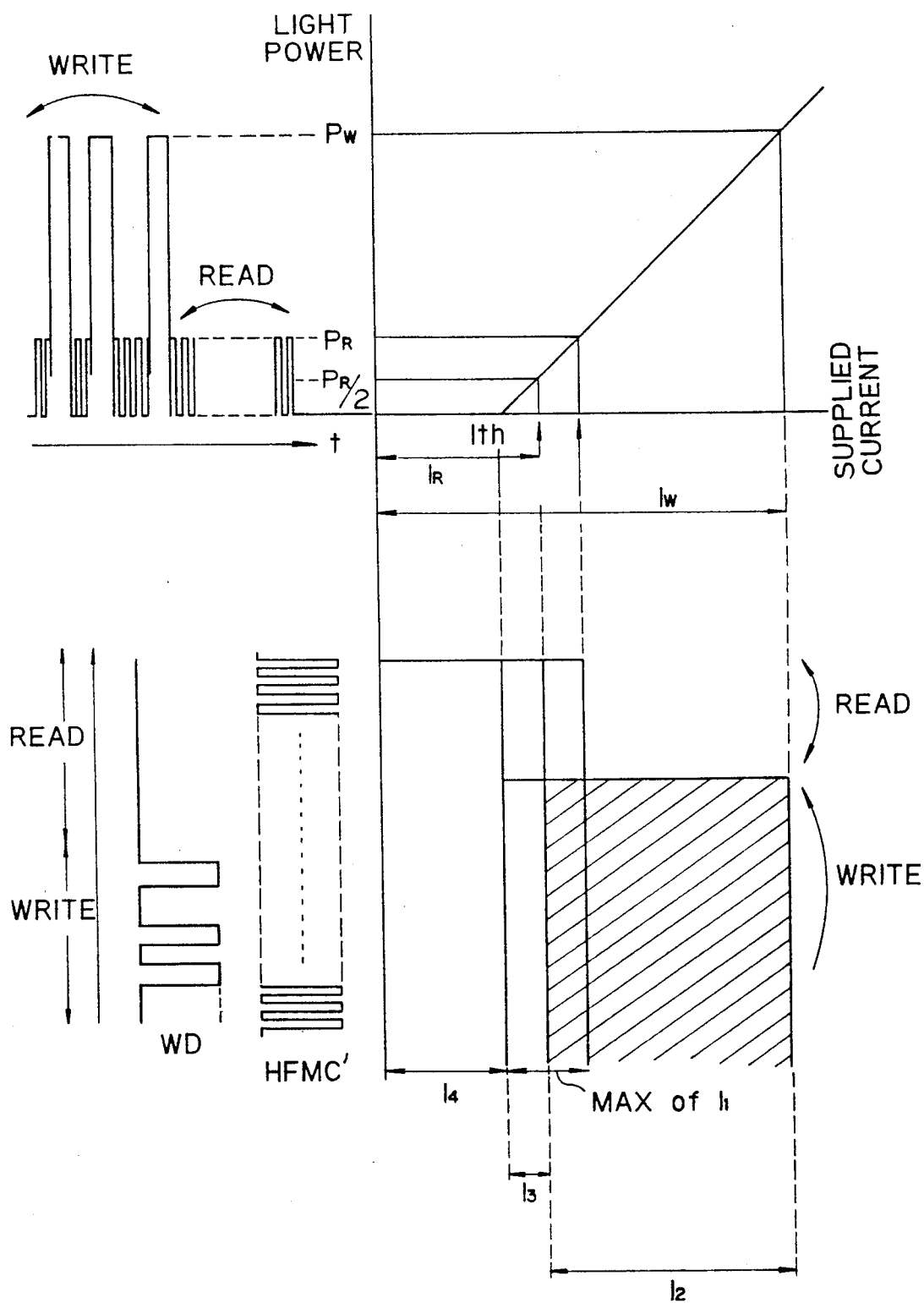
FIG. 25 shows examples of the operations of the power supply circuit of FIG. 21 in the third embodiment of the present invention.

FIG. 25 shows the operation of the power supply circuit of FIG. 21 in the third embodiment of the present invention. In FIG. 25, $I_R$ denotes an average level of the current which is supplied to the laser diode LD during the data read operation, $I_R$ denotes the current which is supplied to the laser diode LD during the data write operation, $I_W - I_R$ denotes the difference between the current $I_W$ and the current $I_R$, $I_{th}$ denotes a threshold value of the current which flows in the laser diode LD and at which the laser diode LD begins to emit light, $P_R$ denotes the maximum power level of the light which is emitted during the reading operation from the laser diode LD corresponding to the above current $I_R$, and $P_W$ denotes the maximum power level of the light which is emitted during the writing operation from the laser diode LD corresponding to the above current $I_W$. Further, $I_1$, $I_2$, $I_3$, and $I_4$ each denote the same current as in FIG. 21.

As shown in FIG. 25, according to the above construction, when either of the write gate signal WGT and the write data signal WDT is inactive, i.e., the above write control signal WD is inactive, the maximum level of the current which is supplied from the first current supply circuit 29 to the laser diode LD is equal to the value $I_1 + I_4$, and correspondingly, the maximum power level of the light which is emitted from the laser diode LD is equal to the value $P_R$. Further, the minimum level of the current which is supplied from the first current supply circuit 29 to the laser diode LD is equal to $I_4$, which is equal to the threshold value $I_{th}$, and therefore, the minimum power level of the light which is emitted from the laser diode LD is equal to zero. This zero light power appears repeatedly due to the above high frequency. Thus, the aforementioned back talk noise can be effectively reduced when reading data. In addition, the high frequency modulation in the low light power improves the SN ratio in the light emitted from the laser diode.

When the above write control signal WD is active, i.e., when writing data, the high frequency control signal HFMS' is maintained at the low level, and therefore, the first current supply circuit 29 does not supply a current to the laser diode LD. Instead of the first current supply circuit 29, the second and third current supply circuits 21 and 22, and the current branch circuit 23 operate by the active write control signal WD. As shown in FIG. 25, the amount of the current $I_3$ which is supplied from the third current supply circuit 22 in the data write operation is set to be equal to the average level of the current which is supplied from the first current supply circuit 29 in the data reading operation and which is equal to a half of the maximum level $I_1$ of the above current which is supplied from the first current supply circuit 29 in the data reading operation. The amount of the current $I_2$ which is supplied from the second current supply circuit 21 in the data write operation is set to be equal to the difference between the total current level $I_W$ flowing through the laser diode LD in the data write operation and the sum of the above current $I_4$ and the above current $I_3$. The current $I_2 + I_3$ may be supplied from one current supply circuit which comprises a current switch circuit and a voltage to current converter. Thus, the total current level of the current which is supplied to the laser diode LD is equal to the value $I_W$, and correspondingly, the maximum power level of the light which is emitted from the laser diode LD is equal to the value $P_W$.

As explained above, in the third embodiment of the present invention, the automatic power control circuit 24 constantly controls the voltage to current converter 24b to output the threshold level $I_{th}$ of the current through the data read operation and the data write operation, and therefore, the aforementioned unstable transient phenomenon does not occur.

Figure 26:
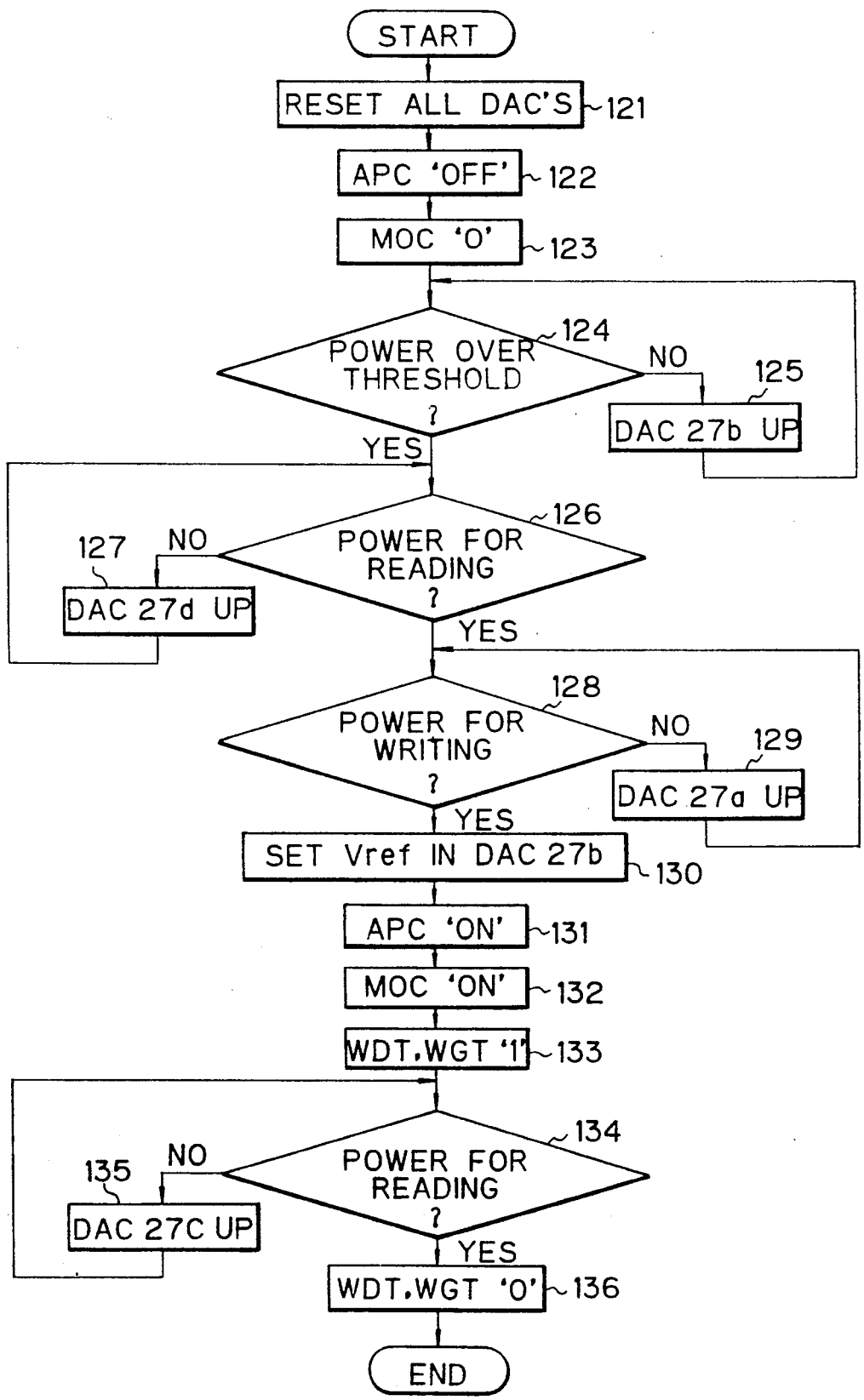
FIG. 26 is a flowchart showing an adjusting operation of the power supply circuit in the third embodiment of the present invention.

(5) Adjustment of the Power Supply Circuit in the third Embodiment (FIG. 26)

FIG. 26 is a flowchart showing an adjusting operation of the power supply circuit in the third embodiment of the present invention.

In the step 121, the digital to analog converters 27a, 27b, 27c, and 27d are reset. In the step 122, the controller 26 makes the automatic power control circuit 24b OFF, i.e., makes the analog switch 64 select the output of the level shift circuit 62 in the construction of FIG. 8. Thus, the controller 26 directly controls the voltage to current converter 24b without the automatic power control loop. In the step 123, the controller 26 makes the mode control signal MOC at the low level for adjusting the current supply circuit. By the above setting, the write control signal WD is maintained at the high level, and the high frequency control signal HFMS' is maintained at the low level, and therefore, the current switch circuits 21a, 22a, and 23a are made ON, and the current switch circuits 29a is made OFF.

In the steps 124 and 125, the controller 26 increments the input value to the digital to analog converter 27b (to the voltage to current converter 24b) until the current through the photodiode PD reaches a first predetermined level for detecting that the laser diode LD begins to emit light, i.e., for detecting that the current supplied to the laser diode LD exceeds the aforementioned threshold value $I_{th}$, while monitoring the current through the photodiode PD by the output of the analog to digital converter 27e. For example, the first predetermined level can be determined to be a current through the photodiode PD corresponding to the light power of 0.1 mW. Then, the controller 26 fixes the input to the digital to analog converter 27b at the value corresponding to the predetermined power $P_R$. Thus, the threshold value $I_{th}$ of the current which flows in the laser diode LD and at which the laser diode LD begins to emit light, is fixed in the digital to analog converter 27b.

In the steps 126 and 127, upon the above setting of the analog to digital converter 27b, the controller 26 increments the input value to the digital to analog converter 27d (to the voltage to current converter 22b) until the current through the photodiode PD reaches a second predetermined level of the current corresponding to the average light power $P_R/2$ for reading, while monitoring the current through the photodiode PD by the output of the analog to digital converter 27d, where $P_R$ is the above-mentioned predetermined maximum level of the light power $P_R$ for reading data, and then fixes the input to the digital to analog converter 27e at the value corresponding to the above power $P_R/2$.

In the steps 128 and 129, upon the above setting of the analog to digital converters 27d, the controller 26 increments the input value to the digital to analog converter 27a (to the voltage to current converter 21b) until the current through the photodiode PD reaches a third predetermined level of the current corresponding to the light power $P_W$ for writing data, while monitoring the current through the photodiode PD by the output of the analog to digital converter 27e, and then fixes the input to the digital to analog converter 27a at the value corresponding to the predetermined power $P_W$.

In the step 130, the controller 26 changes the input to the digital to analog converter 27b to a predetermined value $V_{ref}$ which is to be used for making the laser diode LD emit an average light power $P_R/2$ under the automatic power control, and then makes the automatic power control circuit 24b ON in the step 131, i.e., makes the analog switch 64 to select the output of the integrating error amplifier 63 in the construction of FIG. 8.

In the step 132, the controller 26 makes the mode control signal MOC at the high level, and in the step 133, makes the write gate signal WGT and the write data signal WDT at the high level. Thus, the write control signal WD becomes at the high level, and therefore, the current switch circuits 21a, 22a, and 23a are made ON. In addition, the high frequency control signal HFMS' becomes at the low level, and therefore, the current switch circuit 29a is made OFF.

In the steps 134 and 135, the controller 26 increments the input value to the digital to analog converter 27c (to the voltage to current converter 23b) until the current which is monitored through the analog to digital converter 27e reaches a current corresponding to the above average power $P_R/2$ for reading data, while monitoring the current through the photodiode PD by the output of the analog to digital converter 27e, and then fixes the input to the digital to analog converter 27c at the value corresponding to the above power $P_R/2$.

Finally, in the step 136, the controller 26 makes the write gate signal WGT and the write data signal WDT at the low level to complete the adjusting operation.

(6) The Fourth Embodiment (FIG. 27 to 31)

In the above first, second, and third embodiments, the high frequency modulation is carried out on the current which is supplied to the laser diode LD, before and after each duration in which the write data signal WDT is active. Therefore, the active duration of the write data signal WDT may be changed when a high frequency pulse just before or after an active duration of the write data signal WDT is joined with the active duration. Namely, the size of each area on which a bit "1" is written on a track of an optomagnetic medium, may be changed. To eliminate the above problem, the fourth embodiment is provided as follows.

Figure 27:
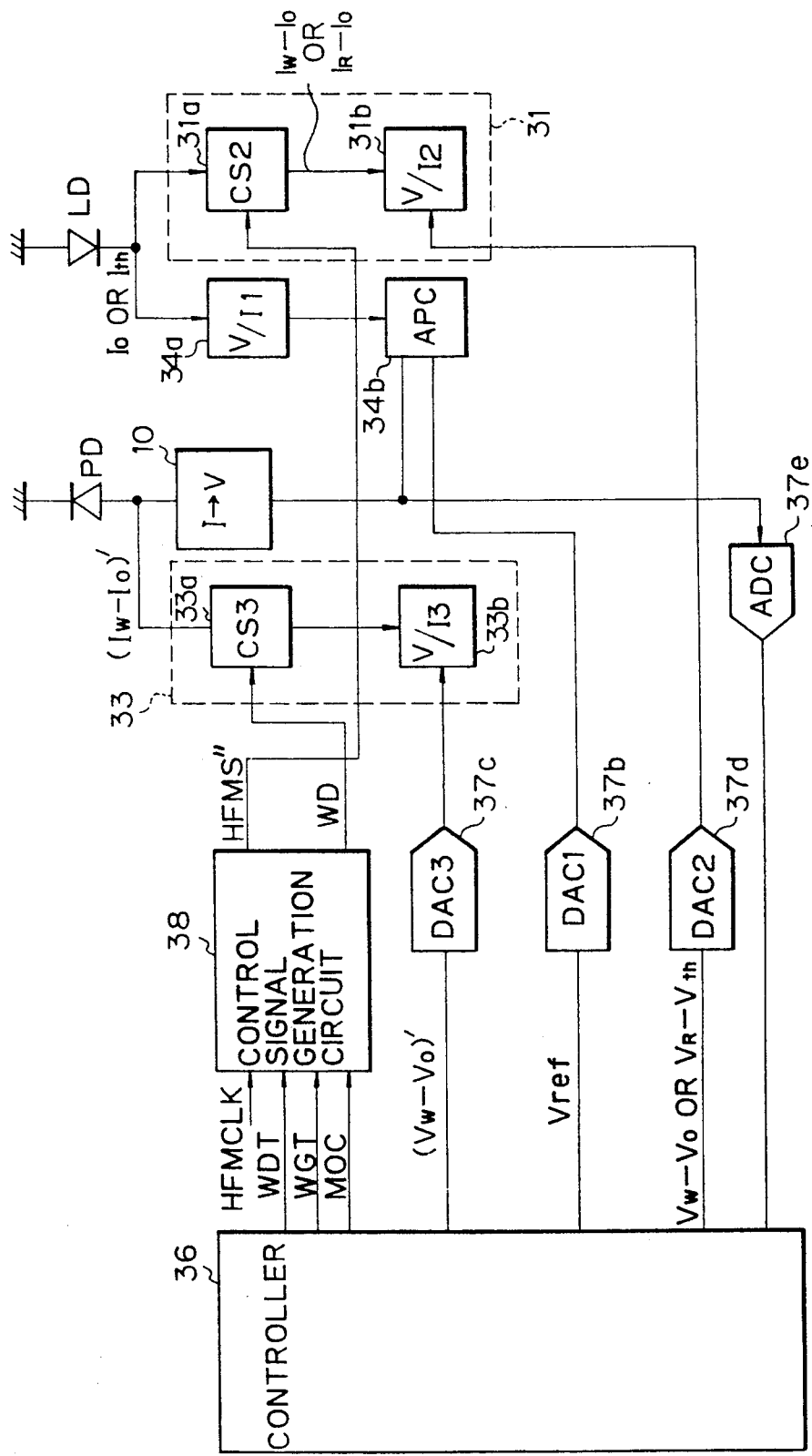
FIG. 27 is a block diagram of the construction used in the fourth embodiment of the present invention.

FIG. 27 is a block diagram of the construction used in the third embodiment of the present invention. In FIG. 27, the laser diode LD, the photodiode PD, and the current to voltage converter 10 are each the same as the corresponding component in the construction of FIGS. 4 and 21, and reference numeral 31 denotes a current supply circuit, 33 denotes a current absorbing circuit (current branch circuit), 33a and 31a each denote a current switch circuit, 33b, 34b, and 31b each denote a voltage to current converter, 34 denotes an automatic power control circuit, 36 denotes a controller, 37b, 37c, and 37d each denote a digital to analog converter, 37e denotes an analog to digital converter, and 38 denotes a control signal generation circuit.

The current supply circuit 31 and the voltage to current converter 34b are connected in parallel to the laser diode LD for supplying a current to the laser diode. Similar to the first, second, and third embodiments as shown in FIGS. 4 and 21, the current to voltage converter 10 and the current branch circuit 33 are connected in parallel to the photodiode PD for passing therethrough a part (or the whole) of the current from the photodiode PD.

The current switch circuit 31a is connected in series between the voltage to current converter 31b and the laser diode LD, and the current switch circuit 33a is connected in series between the voltage to current converter 33b and the laser diode LD. The current switch circuit 31a and the voltage to current converter 31b form the current supply circuit 31, and the current switch circuit 33a and the voltage to current converter 33b form the current branch circuit 33.

The control signal generation circuit 38 generates control signals for controlling the operations of the current switch circuits 31a and 33a, based on control signals which are supplied from the controller 36, as explained later.

The voltage to current converter 34b supplies to the laser diode LD a current the level of which is equal to the aforementioned threshold level $I_{th}$, when reading data, and supplies to the laser diode LD a current $I_O$ the level of which is equal to the average level of the current which is supplied to the laser diode when reading data, when writing data, under the control of the automatic power control circuit 34. In addition to the above current from the voltage to current converter 34b, the current from the current supply circuit 31 is supplied to the laser diode LD. When reading data, the current $I_R - I_{th}$ from the voltage to current converter 31b is supplied to the laser diode LD after modulated by a high frequency in the current switch circuit 31a in addition to the above current $I_{th}$ from the voltage to current converter 34b, as explained later. When writing data, the current $I_W - I_O$ from the current supply circuit 31 is supplied to the laser diode LD in addition to the above current $I_O$ from the voltage to current converter 34b, as explained later.

The construction and the operation of the laser diode LD, the current branch circuit 33, and the current to voltage converter 10, are the same as the corresponding constructions in FIGS. 4 and 21. Similar to the constructions of FIGS. 4 and 21, the current branch circuit 33 operates when writing data, and a part $(I_W - I_O)'$ of the current flowing through the photodiode PD corresponding to the difference $I_W - I_O$ between the current flowing through the laser diode LD when writing data and the average current flowing through the laser diode LD when reading data, flows in the current branch circuit 13 when writing data. The average of the current input to the current to voltage converter 10 is equal to the average current component $I_O$ flowing through the photodiode PD and corresponding to the current which is supplied from the current supply circuit 31 to the laser diode LD. The current to voltage converter 10 outputs a voltage corresponding to the average of the current input, and the output of the current to voltage converter 10 is applied in parallel to the automatic power control circuit 34 and the analog to digital converter 37e. The controller 36 monitors the intensity of the light emitted from the laser diode LD, through the digital to analog converter 37e.

The controller 36 sets through the digital to analog converter 37c a control voltage $(V_W - V_O)'$ corresponding to a current level in the voltage to current converter 33b, and supplies a reference voltage $V_{ref}$ through the digital to analog converter 37b to the automatic power control circuit 34. In addition, when writing data (when a write gate signal WGT is active, as explained later), the controller 36 sets through the digital to analog converter 37d a control voltage $V_W - V_O$ corresponding to an output current level $I_W - I_O$ of the voltage to current converter 31b. When reading data (when the write gate signal WGT is inactive, as explained later), the controller 36 sets through the digital to analog converter 37d a control voltage $V_R - V_{th}$ corresponding to an output current level of the voltage to current converter 22b.

The automatic power control circuit 34 comprises an integrating error amplifier, receives the reference voltage $V_{ref}$ from the digital to analog converter 37b, and compares the above voltage from the current to voltage converter 10 with the reference voltage $V_{ref}$ to obtain an average error voltage (average difference between the output of the current to voltage converter 10 and the reference voltage $V_{ref}$). Then, the above-mentioned control voltage the amount of which corresponds to the above average error voltage, is supplied to the voltage to current converter 34b. The above reference voltage $V_{ref}$ is set so that the amount of the current input to the current to voltage converter 10 is controlled to be equal to the amount of the current through the photodiode PD corresponding to the amount $I_O I_{th}$ of the current through the laser diode LD. Therefore the current which is supplied from the voltage to current converter 34b to the laser diode LD is controlled so that the average power of the light which is emitted from the laser diode LD due to the current from the voltage to current converter 34b is maintained at a constant value $I_O$ when writing data (when a write gate signal WGT is active, as explained later), or is maintained at a constant value $I_{th}$ when reading data (when a write gate signal WGT is inactive, as explained later).

The construction of each of the voltage to current converters 31b, 33b, and 34b is, for example, as shown in FIG. 5, the construction of each of the current switches 31a and 33a is, for example, as shown in FIG. 6, the construction of the current to voltage converter 10 is, for example, as shown in FIG. 7, and the construction of the automatic power control circuit 34 is, for example, as shown in FIG. 8.

Figure 28:
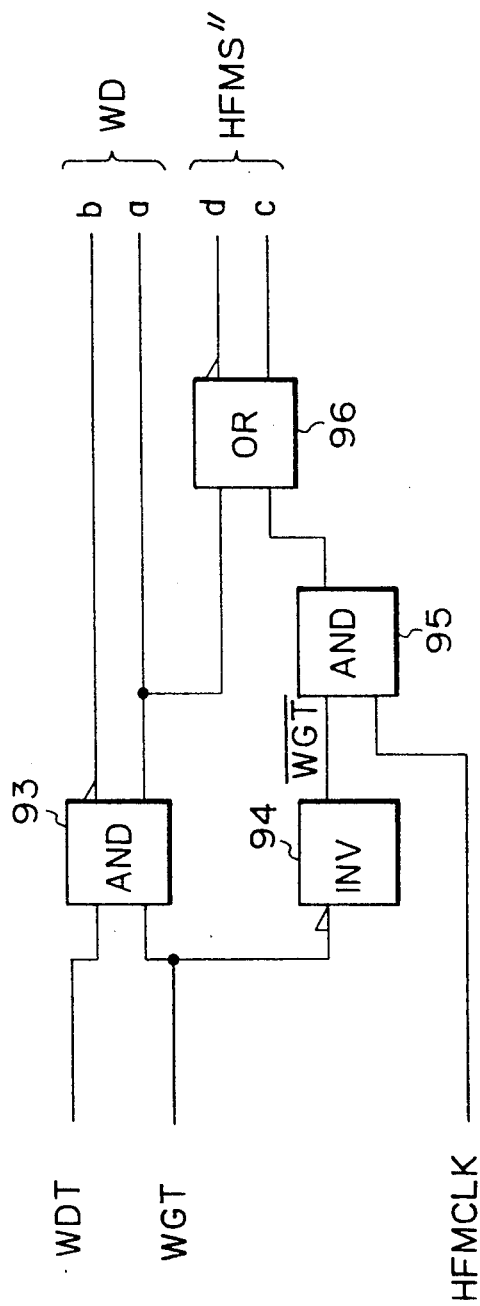
FIG. 28 shows the construction of the control signal generation circuit of FIG. 27 in the fourth embodiment of the present invention.

FIG. 28 shows the construction of the control signal generation circuit 38 of FIG. 27 in the fourth embodiment of the present invention. In FIG. 28, reference numerals 93 and 95 each denote an AND circuit, 94 denotes an inverter, 96 denotes an OR circuit, and HFMS" denotes a high frequency control signal. The other references WGT, HFM CLK, and WD respectively denote the same signals as in FIGS. 9 and 15. The write data signal WDT and the write gate signal WGT, which are output from the controller 36 in FIG. 27, are applied to the AND circuit 93. In the other side, the write gate signal WGT is inverted in the inverter 94, and the inverted write gate signal $\overline{WGT}$ and the high frequency clock HFM CLK are applied to input terminals of the AND circuit 95. The OR circuit 96 outputs a positive logic output a and a negative logic output b, and the pair of the positive logic output a and the negative logic output b form the above write data signal WD, which is the same as the first and second embodiments of FIGS. 9 and 15. The output of the AND circuit 95 and the positive output a of the AND circuit 93 are applied to input terminals of the OR circuit 96. The AND circuit 96 outputs a positive logic output c and a negative logic output d, and the pair of the positive logic output c and the negative logic output d form the above HFMS" signal.

Figure 29:
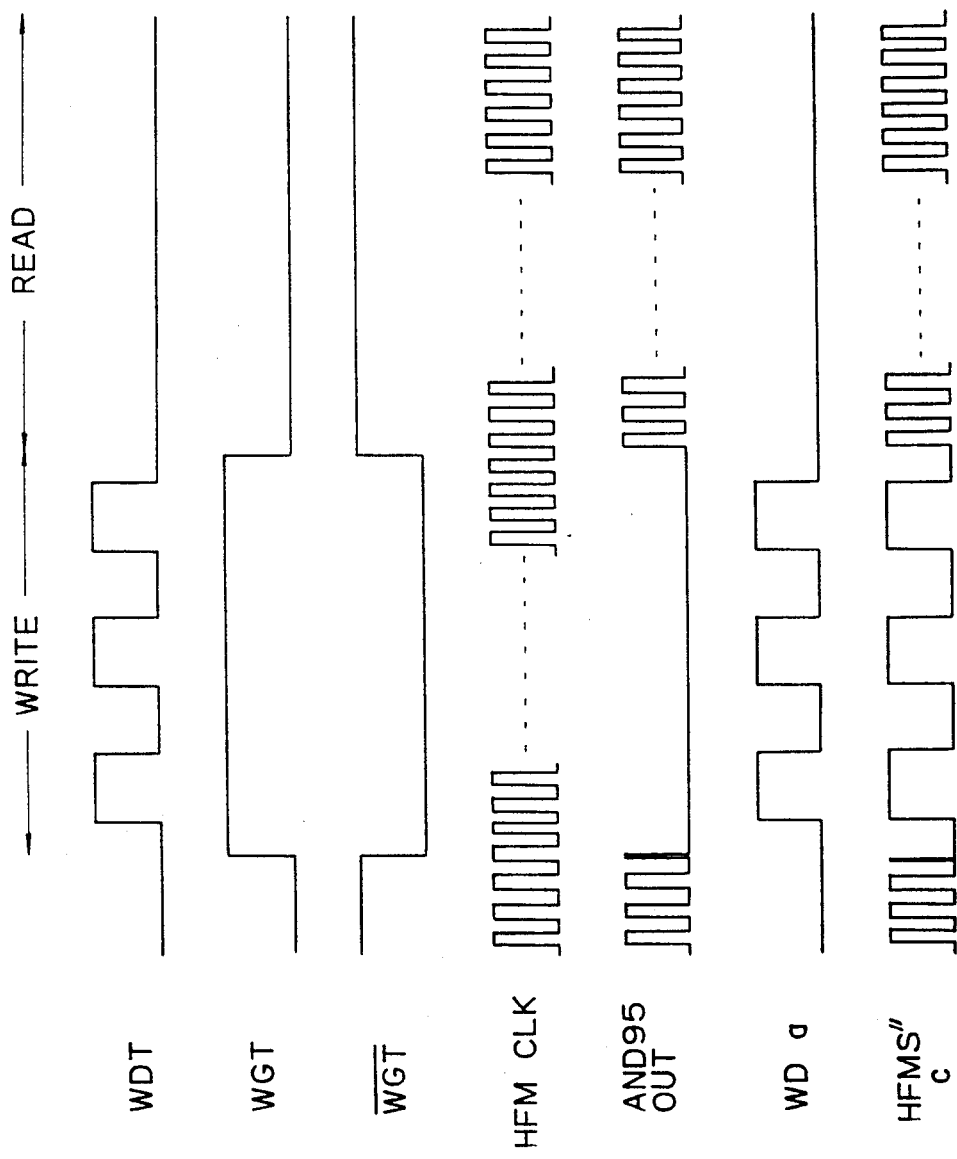
FIG. 29 shows examples of the operations of the control signal generation circuit of FIG. 28.

FIG. 29 shows the operations of the above control signal generation circuit of FIG. 28 in the fourth embodiment of the present invention. FIG. 29 shows the timing of the signals during successive data write operations reading operations. The controller 36 maintains the output level of the write gate signal WGT active during the successive data write operations, and makes the output level of the write data signal WDT active at a time when a light beam is focused on each location where a bit "1" is to be written on a track of an optical medium. The above signal a of the write control signal WD changes its state in the same timing as the write data signal WDT as shown in FIG. 29. In addition, when the write gate signal WGT is active, the high frequency clock signal HFM CLK does not pass through the AND circuit 95, and the HFMS" changes its state in the same timing as the write data signal WDT as shown in FIG. 29.

During a data reading operation, both the write gate signal WGT and the write data signal WDT are maintained inactive. As shown in FIG. 29, the write control signal WD is maintained inactive during the data read operation, and the signal c of the high frequency control signal HFMS" changes its state in the same timing as the high frequency clock signal HFM CLK, as shown in FIG. 29.

The above write data signal WD is supplied to the current switch circuit 33a as its control input, where the above positive logic signal a is applied to the terminal A and the negative logic signal b is applied to the terminal B in the construction as shown in FIG. 6. The above high frequency control signal HFMS" is supplied to the current switch circuits 31a as its control input, where the above positive logic signal c is applied to the terminal A and the negative logic signal d is applied to terminal B in the construction as shown in FIG. 6.

Figure 30:
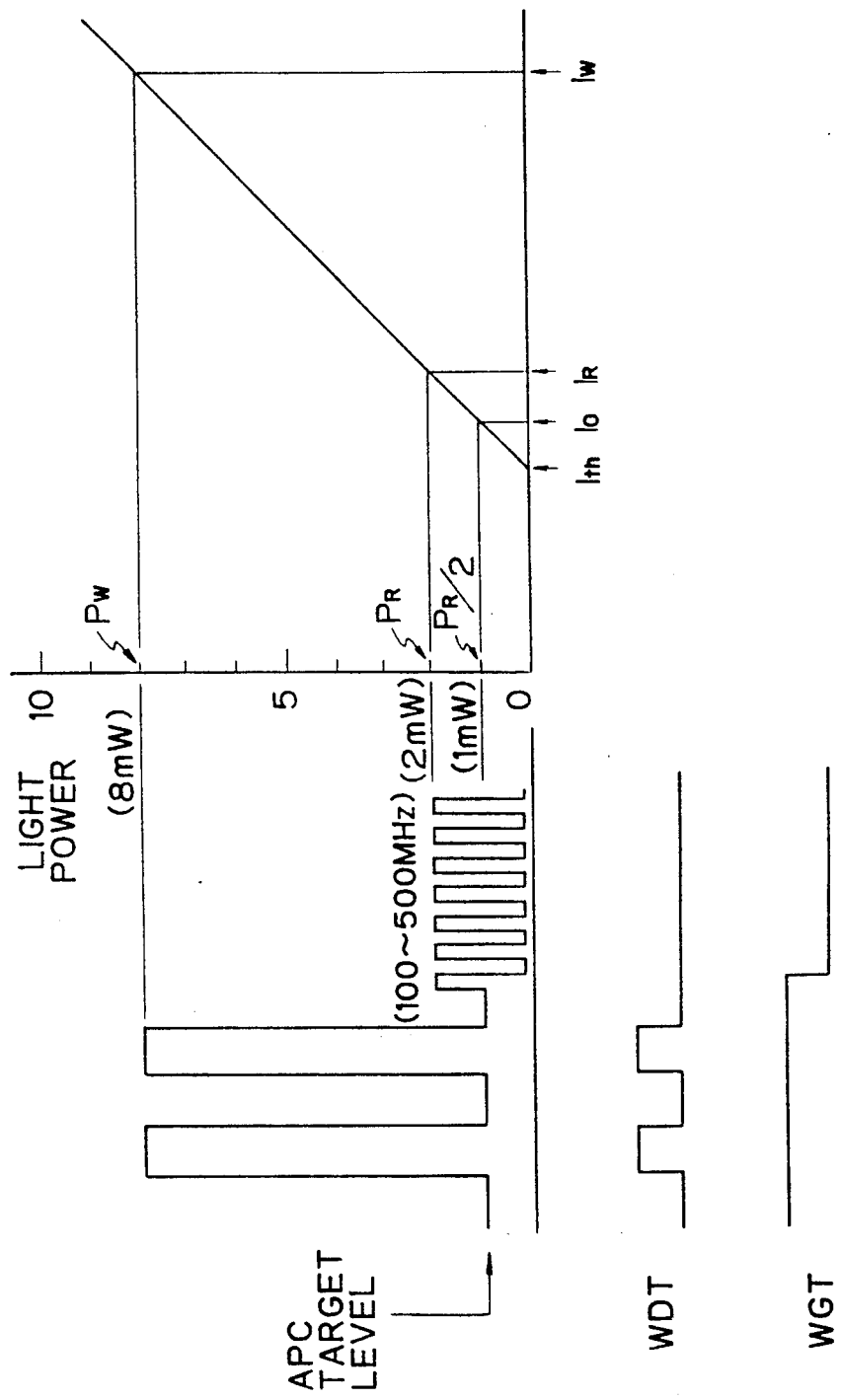
FIG. 30 shows examples of the operations of the power supply circuit of FIG. 27 in the fourth embodiment of the present invention.

FIG. 30 shows the operation of the power supply circuit of FIG. 27 in the fourth embodiment of the present invention. In FIG. 30, $I_R$ denotes the maximum level of the current which is supplied to the laser diode LD during the data read operation, $I_O$ denotes an average level of the current which is supplied to the laser diode LD during the data read operation, $I_W$ denotes the level of the current which is supplied to the laser diode LD during the data write operation, $I_{th}$ denotes a threshold value of the current which flows in the laser diode LD and at which the laser diode LD begins to emit light, $P_R$ denotes the maximum power level of the light which is emitted during the reading operation from the laser diode LD corresponding to the above current $I_R$, and $P_W$ denotes the maximum power level of the light which is emitted during the writing operation from the laser diode LD corresponding to the above current $I_W$.

As shown in FIG. 30, according to the above construction, when the write gate signal WGT is inactive, the controller 36 sets the aforementioned voltage $V_R - V_{th}$ in the voltage to current converter 31b through the digital to analog converter 37d, and therefore, the maximum level of the current which is supplied from the current supply circuit 31 to the laser diode LD is equal to the value $I_R - I_{th}$. Since the current switch circuit 33 is OFF when the write control signal WD is inactive, and the aforementioned reference voltage $V_{ref}$ is constantly supplied to the automatic power control circuit 34, the current which is supplied from the voltage to current converter 34b to the laser diode LD when the write gate signal WGT is inactive, is equal to the value $I_{th}$. Accordingly, the maximum power level of the light which is emitted from the laser diode LD is equal to the value $P_R$. Further, the minimum level of the current which is supplied from the current supply circuit 31 to the laser diode LD is equal to $I_{th}$, and therefore, the minimum power level of the light which is emitted from the laser diode LD is equal to zero. This zero light power appears repeatedly by the above high frequency. Thus, the aforementioned back talk noise can be effectively reduced when reading data. In addition, the high frequency modulation in the low light power improves the SN ratio in the light emitted from the laser diode.

When the above write gate signal WGT is active, i.e., when writing data, the controller 36 sets the aforementioned voltage $V_W - V_O$ in the voltage to current converter 31b through the digital to analog converter 37d, and the high frequency control signal HFMS" changes with the same timing as the write data signal WDT (which is the same as the write control signal WD), and therefore, the current supply circuit 31 supplies the current $I_W - I_O$ to the laser diode LD when the write control signal WD is active. At the same time, the current I0 is supplied to the laser diode LD from the voltage to current converter 34b under the control of the automatic power control circuit 34a. Thus, the total current level of the current which is supplied to the laser diode LD is equal to the value $I_W$, and correspondingly, the maximum power level of the light which is emitted from the laser diode LD is equal to the value $P_W$.

According to the above fourth embodiment of the present invention, the high frequency modulation is not carried out on the current which is supplied to the laser diode LD when the write gate signal WGT is active and the write data signal WDT is inactive. That is, the high frequency modulation is not carried out on the above current before and after each duration in which the write data signal WDT is active. Therefore, the active duration of the write data signal WDT is not changed by the joining of the high frequency pulse just before or after the active duration of the write data signal WDT with the active duration. Namely, the size of each area on which a bit "1" is written on a track of an optomagnetic medium, is not changed.

Figure 31:
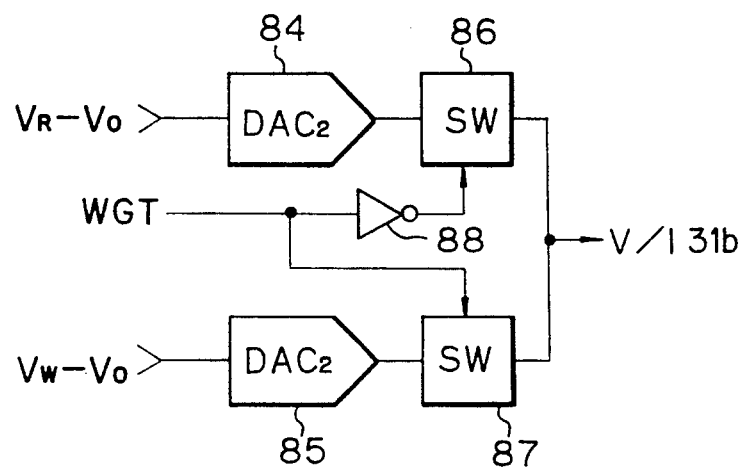
FIG. 31 shows an alternative construction for the digital to analog converter 37d in FIG. 27 in the fourth embodiment of the present invention.

In the above embodiment, the controller 36 sets the aforementioned voltage $V_R - V_{th}$ in the voltage to current converter 31b through the digital to analog converter 37d when the write gate signal WGT is inactive, and the controller 36 sets the aforementioned voltage $V_W - V_O$ in the voltage to current converter 31b through the digital to analog converter 37d when writing data. In stead of the above construction of the digital to analog converter 37d in FIG. 27, the construction shown in FIG. 31 can be used. In FIG. 31, reference numerals 84 and 85 each denote a digital to analog converter, 86 and 87 each denote a switch, and 88 denotes an inverter. The switch 86 is connected between the digital to analog converter 84 and the voltage to current converter 31b, and the switch 87 is connected between the digital to analog converter 85 and the voltage to current converter 31b. The value $V_R - V_O$ is preset by the controller 36 in the digital to analog converter 84, and the value $V_W - V_O$ is preset by the controller 36 in the digital to analog converter 85. When the write gate signal WGT is inactive, the switch 86 is made OFF and the switch 87 is made ON, and when the write gate signal WGT is active, the switch 87 is made OFF and the switch 86 is made ON, therefore, the above value $V_R - V_O$ is supplied to the voltage to current converter 31b when the write gate signal WGT is inactive, and the above value $V_W - V_O$ is supplied to the voltage to current converter 31b when the write gate signal WGT is active.

Figure 32A:
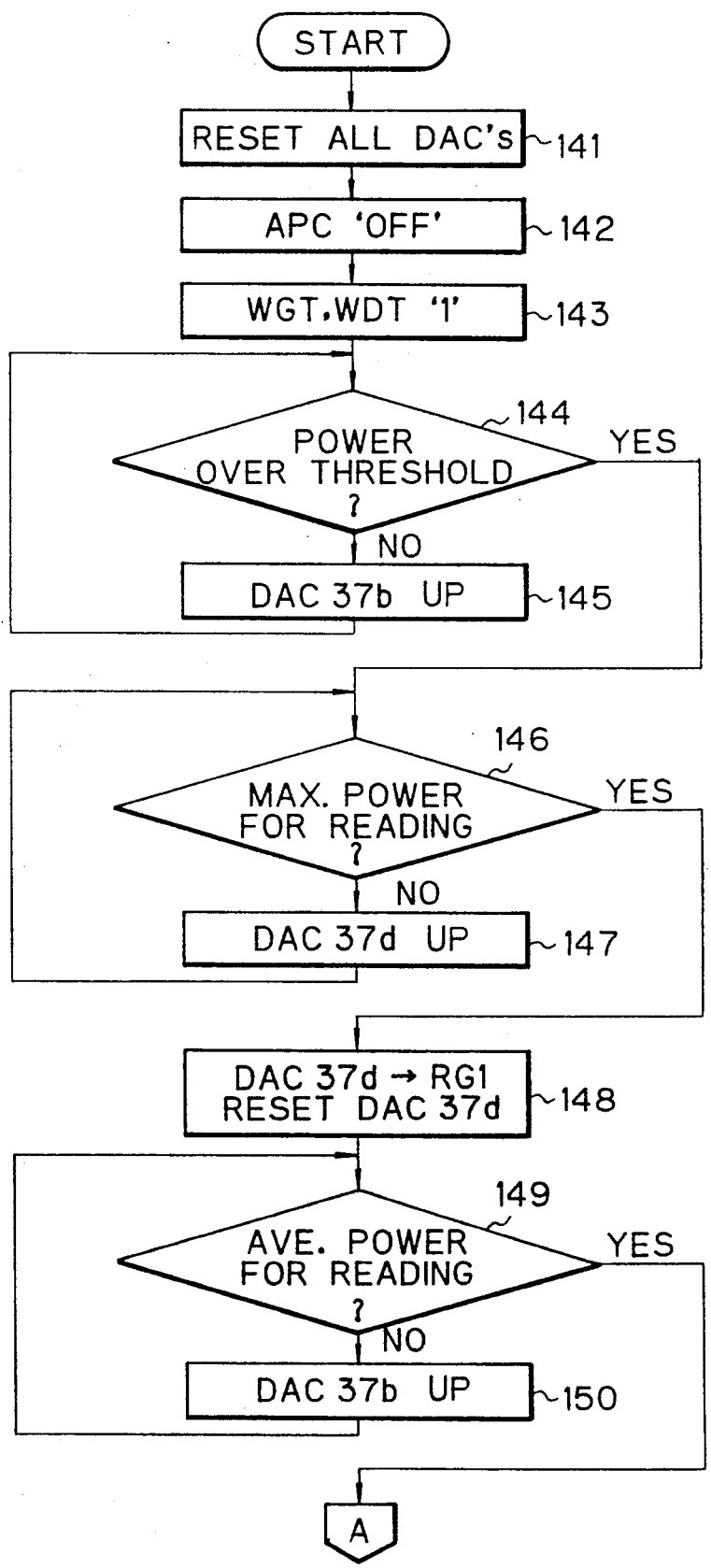
FIGS. 32A to 32C shows a flowchart of an adjusting operation of the power supply circuit in the third embodiment of the present invention.
Figure 32B:
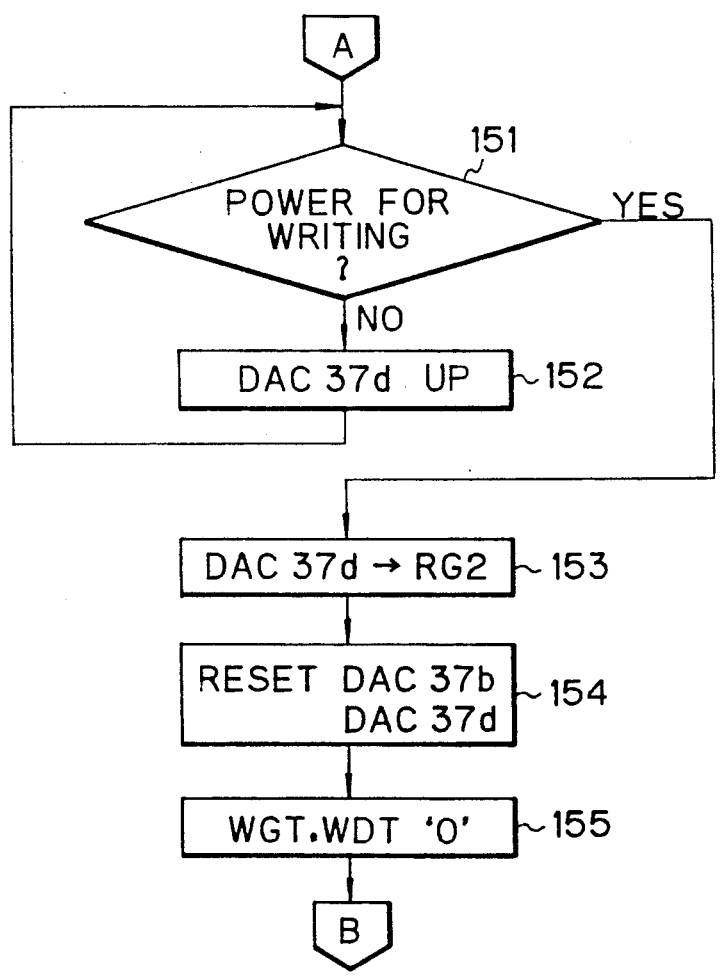
Figure 32C:
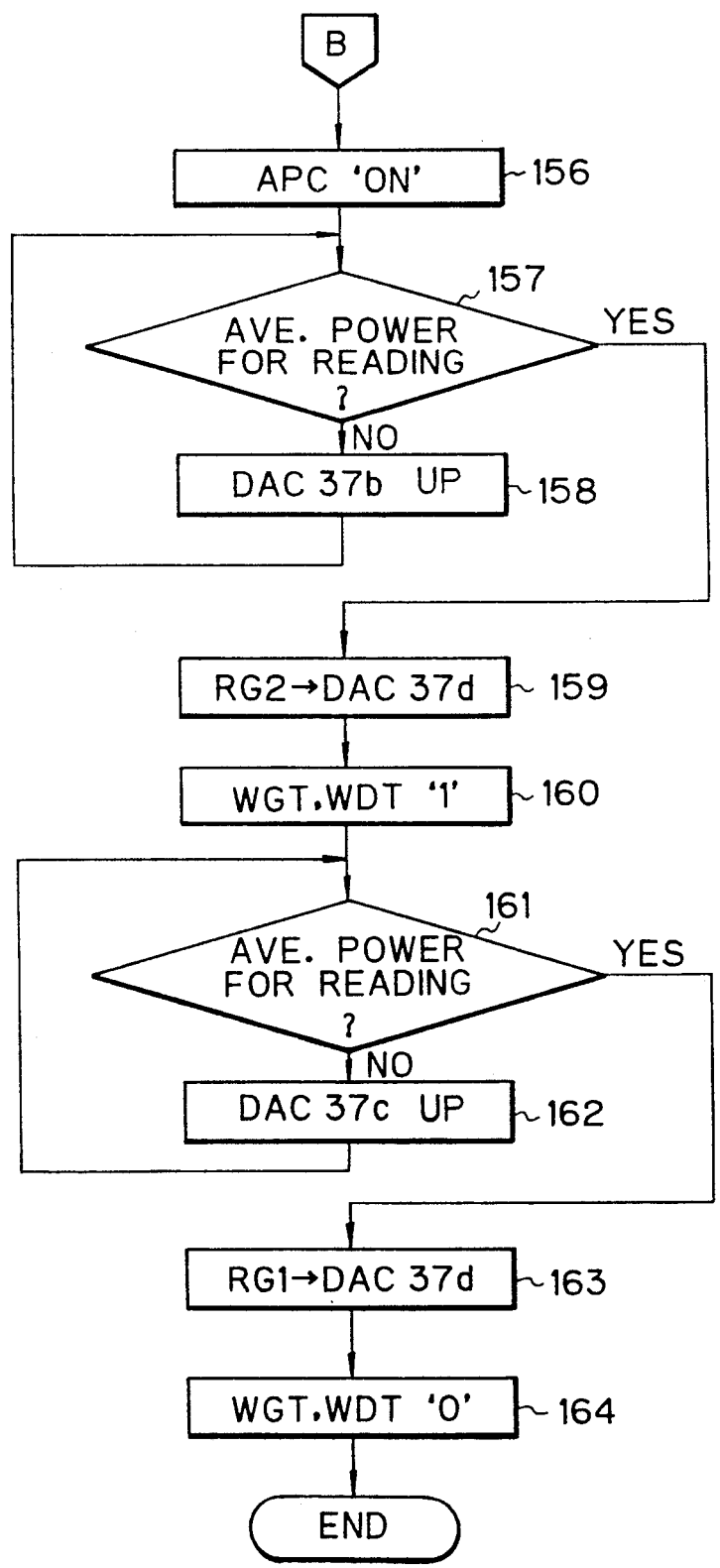

(7) Adjustment of the Power Supply Circuit in the Fourth Embodiment (FIGS. 32A to 32C)

FIGS. 32A to 32C is a flowchart showing an adjusting operation of the power supply circuit in the fourth embodiment of the present invention.

In the step 141, the digital to analog converters 37a, 37b, 37c, and 37d are reset. In the step 142, the controller 36 makes the automatic power control circuit 34 OFF, i.e., makes the analog switch 64 to select the output of the level shift circuit 62 in the construction of FIG. 8. Thus, the controller 36 directly controls the voltage to current converter 34a without the automatic power control loop. In the step 143, the controller 36 makes the write gate signal WGT and the write data signal WDT in the high level. By the above setting, both the write control signal WD and the high frequency control signal HFMS" are maintained at the high level, and therefore, the current switch circuits 31a and 33a are made ON.

In the steps 144 and 145, the controller 36 increments the input value to the digital to analog converter 37b (to the voltage to current converter 34b) until the current through the photodiode PD reaches a first predetermined level for detecting that the laser diode LD begins to emit light, i.e., for detecting that the current to the laser diode LD exceeds the threshold value $I_{th}$, while monitoring the current through the photodiode PD by the output of the analog to digital converter 37e. For example, the first predetermined level can be determined to be a current through the photodiode PD corresponding to the light power of 0.1 mW. Then, the controller 36 fixes the input to the digital to analog converter 37b at the value corresponding to the predetermined power $P_R$. Thus, the aforementioned threshold value $I_{th}$ of the current which flows in the laser diode LD and at which the laser diode LD begins to emit light, is fixed in the digital to analog converter 37b.

In the steps 146 and 147, upon the above setting of the analog to digital converter 37b, the controller 36 increments the input value to the digital to analog converter 37d (to the voltage to current converter 31b) until the current through the photodiode PD reaches a second predetermined level $I_R$ of the current corresponding to the maximum light power $P_R$ for reading, while monitoring the current through the photodiode PD by the output of the analog to digital converter 37e, where $P_R$ is the above-mentioned predetermined maximum level of the light power $P_R$ for reading data. Then, in the step 148, the controller 36 writes the above value corresponding to the above power $P_R$ in a register RG1 which is provided in the controller 36, and resets the digital to analog converter 37d.

In the steps 149 and 150, the controller 36 increments the input value to the digital to analog converter 37b (to the voltage to current converter 34b) until the current through the photodiode PD reaches a third predetermined level $I_O$ of the current corresponding to the aforementioned average light power $P_R/2$ for reading data, while monitoring the current through the photodiode PD by the output of the analog to digital converter 37e, and then fixes the input to the digital to analog converter 37b at the value corresponding to the predetermined power $P_R/2$.

In the steps 151 and 152, upon the above setting of the analog to digital converters 37b, the controller 36 increments the input value to the digital to analog converter 37d (to the voltage to current converter 31b) until the current through the photodiode PD reaches a fourth predetermined level of the current corresponding to the light power $P_W$ for writing data, while monitoring the current through the photodiode PD by the output of the analog to digital converter 37e. Then, in the step 153, the controller 36 writes the above value corresponding to the above power $P_W$ in a register RG2 which is provided in the controller 36, and resets the digital to analog converters 37b and 37d in the step 154.

In the step 155, the controller 36 makes the write gate signal WGT and the write data signal WDT at the low level. In the step 156, the automatic power control circuit 34 is made ON, i.e., the analog switch 64 of FIG. 8 is controlled to select the output of the integrating error amplifier 63.

In the steps 157 and 158, the controller 36 increments the input value to the digital to analog converter 37b (to the voltage to current converter 34b) until the current through the photodiode PD reaches the third predetermined level $I_O$ of the current corresponding to the aforementioned average light power $P_R/2$ for reading data, while monitoring the current through the photodiode PD by the output of the analog to digital converter 37e, and then fixes the input to the digital to analog converter 37b at the value corresponding to the predetermined power $P_R/2$.

In the step 159, the above-mentioned value written in the register RG2 is supplied to the digital to analog converter 37d, and in the step 160, the controller 36 makes the write gate signal WGT and the write data signal WDT at the high level.

In the steps 161 and 162, the controller 36 increments the input value to the digital to analog converter 37c (to the voltage to current converter 33b) until the current which is monitored through the analog to digital converter 37e reaches the third predetermined level $I_O$ of the current corresponding to the aforementioned average light power $P_R/2$ for reading data, while monitoring the current through the photodiode PD by the output of the analog to digital converter 37e. Then, in the step 163, the above-mentioned value written in the register RG2 is supplied to the digital to analog converter 37d. Finally, in the step 164, the controller 36 makes the write gate signal WGT and the write data signal WDT at the low level to complete the adjusting operation.

Figure 33:
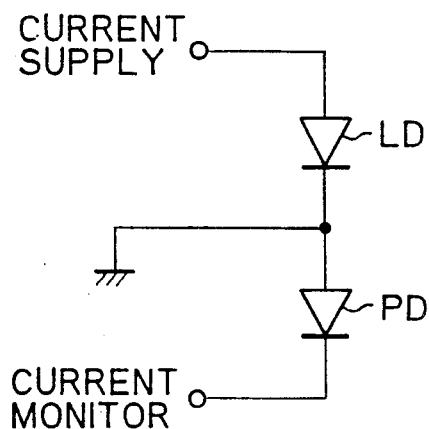
FIGS. 33 and 34 show the possible connections of the laser diode and the photodiode.
Figure 34:
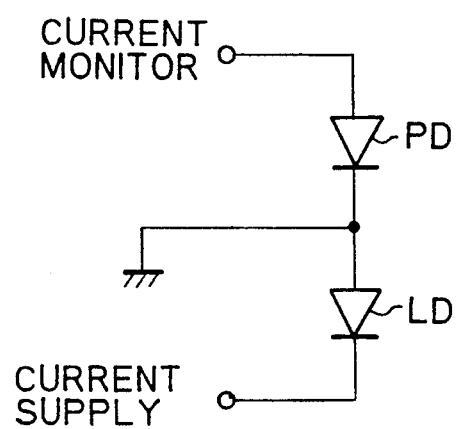

In a normal operation of the current supply circuit of FIG. 27, the above-mentioned value written in the register RG2 is supplied to the digital to analog converter 37d when it is detected that the write gate signal WGT is at the high level, or the above-mentioned value written in the register RG1 is supplied to the digital to analog converter 37d when it is detected that the write gate signal WGT is at the low level (8) Variations of the Embodiments (FIGS. 33 and 34)

Figure 35:
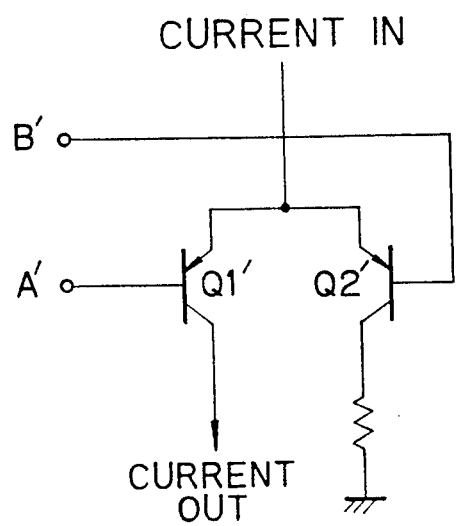
FIG. 35 shows another example of the construction for the current switch circuits.
Figure 36:
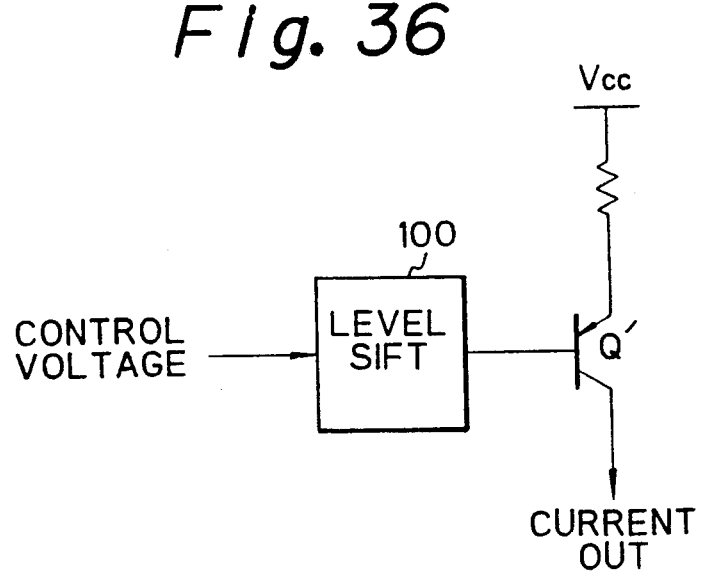
FIG. 36 shows another example of the construction for the voltage to current converters.

Generally, the above-mentioned laser diode LD for emitting light for writing and reading data which is written on the optomagnetic medium, and the photodiode PD for monitoring the light which is emitted from the above laser diode LD are electrically connected in two ways, as shown in FIGS. 33 and 34. The first to fourth embodiments explained above, are based on the connection as shown in FIG. 33, and the constructions of the first to fourth embodiments explained above, can be applied to the connection of FIG. 34 by inverting the direction of current flowing through the constructions, where inverting of the direction of the current means that the directions of the laser diode, the photodiode, and the current supply circuits, are inverted, and, for example, the construction of FIG. 35 may be used for the current switch circuits, and the construction of FIG. 36 may be used for the voltage to current converters.

We claim:

1. A power supply circuit for supplying electric power to a laser diode for reading digital data on an optical memory medium, said laser diode emitting light when a current flowing therethrough exceeds a threshold level, said power supply circuit comprising:

current source means for providing electrical current;

automatic power control means coupled to said current source means for controlling said current which is output from said current source means, wherein an average power of light emitted from said laser diode is equal to a predetermined value;

high frequency signal generating means coupled to said laser diode for generating a high frequency signal; and high frequency current control means for controlling a current which is supplied from said automatic power control means and said current source means to the laser diode, wherein the current flowing through the laser diode is modulated by said high frequency signal, and a minimum level of the current through the laser diode is maintained below the threshold level, said minimum level appearing in each cycle of the current modulated by said high frequency signal, and wherein said high frequency current control means comprises a switching means for controlling said current which is output from said current source means to supply the current to said laser diode, according to levels of said high frequency signals.

2. A power supply circuit for supplying electric power to a laser diode for reading digital data on an optical memory medium, said laser diode emitting light when a current flowing therethrough exceeds a threshold level, said power supply circuit comprising:

first and second current sources each for providing electrical current;

automatic power current control means coupled to said second current source means for controlling said current which is output from said second current source means, wherein an average power of light emitted from said laser diode due to a sum of the currents which are supplied from said first and second current sources, is equal to a predetermined value;

high frequency signal generating means coupled to said laser diode for generating a high frequency signal; and high frequency current control means for controlling a current which is supplied from said automatic power control means and said first current source means to the laser diode, wherein the current flowing through the laser diode is modulated by said high frequency signal, and a minimum level of the current through the laser diode is maintained below the threshold level, said minimum level appearing in each cycle of the current modulated by said high frequency signal.

3. A power supply circuit according to claim 2, wherein said high frequency current control means comprises a switching means for controlling said current which is output from said current source to supply the current to said laser diode, according to levels of said high frequency signals.

4. A power supply circuit according to claim 2, wherein said predetermined value is equal to said threshold value.

5. A power supply circuit for supplying electric power to a laser diode for reading and writing digital data on an optical memory medium, said laser diode emitting light when a current flowing therethrough exceeds a threshold level, said power supply circuit comprising:

current source means for providing electrical current;

automatic power control means for controlling said current which is output from said current source means, wherein an average power of light emitted from said laser diode is equal to respected predetermined values in reading and writing data;

high frequency signal generating means coupled to said laser diode for generating a high frequency signal; and high frequency current control means for controlling a current which is supplied from said automatic power control means and said current source means to the laser diode, wherein the current flowing through the laser diode is modulated by said high frequency signal, and a minimum level of the current through the laser diode is maintained below the threshold level, said minimum level appearing in each cycle of the current modulated by said high frequency signal, and wherein said high frequency current control means comprises a switching means for controlling said current which is output from said current source to supply the current to said laser diode according to levels of said high frequency signals.

6. A power supply circuit for supplying electric power to a laser diode for reading digital data on an optical memory medium, said laser diode emitting light when a current flowing therethrough exceeds a threshold level, said power supply circuit comprising:

first and second current sources each for providing electrical current;

automatic power current means coupled to said second current source means for controlling said current output from said second current source means, wherein an average power of light emitted from said laser diode due to a sum of the currents which are supplied from said first and second current sources, is equal to respective predetermined values in reading and writing data;

high frequency signal generating means coupled to said laser diode for generating a high frequency signal; and high frequency current control means for controlling a current which is supplied from said automatic power control means and said first current source means to the laser diode, wherein the current flowing through the laser diode is modulated by said high frequency signal, and a minimum level of the current through the laser diode is maintained below the threshold level, said minimum level appearing in each cycle of the current modulated by said high frequency signal.

7. A power supply circuit according to claim 6, wherein said high frequency current control means comprises a switching means for controlling said current which is output from said current source to supply the current to said laser diode according to levels of said high frequency signals.

8. A power supply circuit according to claim 6, wherein said predetermined value in reading data is equal to said threshold value.

9. A power supply circuit for supplying electric power to a laser diode for writing and reading digital data on an optical memory medium, said laser diode emitting light when a current flowing therethrough exceeds a threshold level, said power supply circuit comprising:

light power monitoring means for monitoring a power of the light emitted from said laser diode, and for providing a current corresponding to the power of the monitored light;

a first current supplying circuit for supplying a first current to said laser diode to make the laser diode emit a first power level of light as an average for reading data;

a second current supplying circuit for supplying in parallel with said first current supplying circuit a second current to said laser diode, wherein the laser diode emits a second power level of light as an average for writing data;

current branch circuit coupled to said light power monitor means, for receiving a part of the current from the light power monitoring means, said part of said current corresponding to a difference between said second power level and said first power level of the light;

high frequency signal generating means coupled to said laser diode for generating a high frequency signal;

automatic power control means coupled to said light power monitor means, receiving a remaining part of the current from the light power monitoring means, and for controlling an average power of a part of light which is emitted from said laser diode based upon current from said first current supplying circuit, such that it is equal to a predetermined value based on the received current; and a central control means for controlling said first and second current supplying circuits, said current branch circuit, and said automatic power control means, and operating the second current supplying circuit and said current branch circuit only when writing data;

said first current supplying circuit comprising a high frequency current control means for controlling a current flow through the laser diode wherein the current flowing through the laser diode is modulated by said high frequency signal when controlled by said central control means, and a minimum level of the current which flows through the laser diode is maintained below the threshold level, said minimum level appearing in each cycle of the current modulated by said high frequency signal.

10. A power supply circuit according to claim 9, wherein said central control means controls said high frequency current control means to modulate the current flowing through the laser diode by the levels of said high frequency signals only when reading data.

11. A power supply circuit according to claim 10, wherein said central control means outputs an active write data signal when writing data, and an active write gate signal the duration of which contains each write data signal with margins before and after a duration of the write data signal, said high frequency current control means modulates the current flowing through the laser diode by the levels of said high frequency signals when said write gate signal is inactive, and said second current supplying circuit and said current branch circuit are in operation only when said write data signal is active.

12. A power supply circuit according to claim 9, wherein said central control means controls said high frequency current control means to modulate the current flowing through the laser diode by the levels of said high frequency signals through the writing and reading operations.

13. A power supply circuit according to claim 9, wherein said high frequency current control means comprises;

a current source means for providing constant electrical current, and switching means for controlling said constant current output from said current source to supply the current to said laser diode according to levels of said high frequency signals when so controlled by said central control means.

14. A power supply circuit for supplying an electric power to a laser diode for writing and reading digital data on an optical memory medium, said laser diode emitting light when a current flowing therethrough exceeds a threshold level, said power supply circuit comprising:

light power monitoring means for monitoring a power of the light which is emitted from said laser diode, and outputting a current corresponding to the power of the monitored light;

a first current supplying circuit for selectively supplying a first current to said laser diode to make the laser diode emit a first power level of light as an average for reading data, or supplying a second current to said laser diode to make the laser diode emit a second power level of light as an average for writing data;

a second current supplying circuit for supplying in parallel with said first current supplying circuit a third current to said laser diode;

a current branch circuit for receiving a part of the current from the light power monitoring means, where said part of the current corresponds to the difference from said second power level and said first power level of the light;

automatic power control means coupled to said light power monitor means, receiving a remaining part of the current from the light power monitoring means, and for controlling an average power of a part of light emitted from said laser diode to which part the current from said second current supplying circuit, such that it is equal to a predetermined value based on the received current;

high frequency signal generating means for generating a high frequency signal, and central control means for controlling said first and second current supplying circuits, said current branch circuit, and said automatic power control means, operating said first current supplying circuit to supply said first current corresponding to said first power level when reading data, and supplying said second current corresponding to said second power level when writing data, and operates the current branch circuit when writing data;

said first current supplying circuit comprising a high frequency current control means for controlling a current flow through the laser diode wherein the current flowing through the laser diode is modulated by said high frequency signal when so controlled by said central control means, and a minimum level of the current which flows through the laser diode is maintained below the threshold level, said minimum level appearing in each cycle of the current modulated by said high frequency signal.

15. A power supply circuit according to claim 14, wherein the amount of said third current is controlled to be equal to said threshold value.

16. A power supply circuit according to claim 14, wherein said central control means operates said high frequency current control means to modulate the current flowing through the laser diode by the levels of said high frequency signals only when reading data.

17. A power supply circuit according to claim 14, wherein said central control means outputs an active write data signal when writing data, and an active write gate signal which contains the duration of each write data signal with margins before and after a duration of the write data signal, said high frequency current control means modulates the current flowing through the laser diode by the levels of said high frequency signals when said write gate signal is inactive, and said second current supplying circuit and said current absorbing circuit are in operation only when said write data signal is active.

18. A power supply circuit according to claim 14, wherein said central control means operates said high frequency current control means to modulate the current flowing through the laser diode by the levels of said high frequency signals through the writing and reading operations.

19. A power supply circuit according to claim 14, wherein said high frequency current control means comprises, current source means for selectively providing a first constant current to emit said first power level of light for reading data, or a second constant current to emit said second power level of light for writing data, under control of said central control means, and switching means for controlling said constant current output from said current source to supply current to said laser diode according to levels of said high frequency signals when so controlled by the central control means.

20. A power supply circuit according to claim 19, wherein said central control mean operates said switching means to modulate the current flowing through the laser diode by the levels of said high frequency signals only when reading data.

21. A power supply circuit according to claim 19, wherein said central control means outputs an active write data signal when writing data, and an active write gate signal which contains the duration of each write data signal with margins before and after a duration of the write data signal, said high frequency current control means modulates the current flowing through the laser diode by the levels of said high frequency signals when said write gate signal is inactive, and said second current supplying circuit and said current branch circuit are in operation only when said write data signal is active.

22. A power supply circuit according to claim 19, wherein said central control means operates said switching means to modulate the current flowing through the laser diode by the levels of said high frequency signals through the writing and reading operations.

23. A power supply circuit for supplying electric power to a laser diode for writing and reading digital data on an optical memory medium, said laser diode emitting light when a current flowing therethrough exceeds a threshold level, said power supply circuit comprising:

light power monitoring means for monitoring a power of the light emitted from said laser diode, and providing an electrical current which corresponds to the power of the monitored light;

a first current supplying circuit for supplying a first current to said laser diode to make the laser diode emits a first power level of light as an average for reading data;

a second current supplying circuit for supplying, as an alternative of said first current supplying circuit, a second current to said laser diode wherein the laser diode emits a second power level of light as an average for writing data;

a third current supplying circuit for supplying in parallel with said first or second current supplying circuit a third current to said laser diode;

a current branch circuit for receiving a part of the current from the light power monitoring means, where said part corresponds to the difference from said second power level and said first power level of the light;

high frequency signal generating means for generating a high frequency signal;

automatic power control means coupled to said light power monitoring means, said automatic power control means receiving a remaining part of the current from the light power monitoring means, and for controlling an average power of a part of light emitted from said laser diode, said part of light generated by the current from said third current supplying circuit, such that it is equal to a predetermined value based on the received current; and central control means for controlling said first, second, and third current supplying circuits, said current branch circuit, and said automatic power control means, said central control means operating the first and third current supplying circuits when reading data, and operating the second and third current supplying circuits, and said current absorbing circuit when writing data;

said first current supplying circuit comprising a high frequency current control means for controlling a current flow through the laser diode wherein the current flowing through the laser diode is modulated by said high frequency signal when controlled by said central control means, and a minimum level of the current which flows through the laser diode is maintained below the threshold level, said minimum level appearing in each cycle of the current modulated by said high frequency signal.

24. A power supply circuit according to claim 23, wherein the amount of said third current is controlled to be equal to said threshold value.

25. A power supply circuit according to claim 23, wherein said central control means operates said high frequency current control means to modulate the current flowing through the laser diode by the levels of said high frequency signals only when reading data.

26. A power supply circuit according to claim 25, wherein said central control means outputs an active write data signal when writing data, and an active write gate signal which contains the duration of each write data signal with margins before and after a duration of the write data signal, said high frequency current control means modulating the current flowing through the laser diode by the levels of said high frequency signals when said write gate signal is inactive, and said second and third current supplying circuits, and said current branch circuit are in operation only when said write data signal is active.

27. A power supply circuit according to claim 23, wherein said central control means operates said high frequency current control means to modulate the current flowing through the laser diode by the levels of said high frequency signals through the writing and reading operations.

28. A power supply circuit according to claim 23, wherein said high frequency current control means comprises, current source means for outputting a constant current, and a switching means for controlling said constant current which is output from said current source to supply the current to said laser diode according to levels of said high frequency signals when so controlled by said central control means.

29. A power supply circuit according to claim 28, wherein said central control means operates said switching means to modulate the current flowing through the laser diode by the levels of said high frequency signals only when reading data.

30. A power supply circuit according to claim 28, wherein said central control means outputs an active write data signal when writing data, and an active write gate signal which contains the duration of each write data signal with margins before and after a duration of the write data signal, said high frequency current control means modulates the current flowing through the laser diode by the levels of said high frequency signals when said write gate signal is inactive, and said second current supplying circuit and said current branch circuit only when said write data signal is active.

31. A power supply circuit according to claim 28, wherein said central control means operates said switching means to modulate the current flowing through the laser diode by the levels of said high frequency signals through the writing and reading operations.

* * * * *